(12) United States Patent
Tanaka et al.

(10) Patent No.: US 12,320,540 B2
(45) Date of Patent: Jun. 3, 2025

(54) AIR CONDITIONING SYSTEM

(71) Applicant: DAIKIN INDUSTRIES, LTD., Osaka (JP)

(72) Inventors: Shuuichi Tanaka, Osaka (JP); Yoshiteru Nouchi, Osaka (JP); Kouji Tatsumi, Osaka (JP); Ryouta Suzuki, Osaka (JP); Taishi Nakashima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 596 days.

(21) Appl. No.: 17/603,763

(22) PCT Filed: Dec. 27, 2019

(86) PCT No.: PCT/JP2019/051585
§ 371 (c)(1),
(2) Date: Oct. 14, 2021

(87) PCT Pub. No.: WO2020/213216
PCT Pub. Date: Oct. 22, 2020

(65) Prior Publication Data
US 2022/0235961 A1  Jul. 28, 2022

(30) Foreign Application Priority Data

Apr. 15, 2019 (JP) ................ 2019-077305
Jun. 24, 2019 (JP) ................ 2019-116144

(51) Int. Cl.
*F24F 11/79* (2018.01)
*F24F 7/08* (2006.01)

(52) U.S. Cl.
CPC ............ *F24F 11/79* (2018.01); *F24F 7/08* (2013.01)

(58) Field of Classification Search
CPC .. F24F 3/001; F24F 11/74; F24F 11/89; F24F 3/044; F24F 13/02; F24F 2110/40; F24F 2003/0448; F24F 2007/005; F24F 7/065
See application file for complete search history.

(56) References Cited

U.S. PATENT DOCUMENTS

| 4,513,574 A | 4/1985 | Humphreys et al. |
| 4,635,445 A | 1/1987 | Otsuka et al. |

(Continued)

FOREIGN PATENT DOCUMENTS

| CN | 101769574 A | 7/2010 |
| CN | 109163386 A | 1/2019 |

(Continued)

OTHER PUBLICATIONS

Chinese Office Action and Search Report for Chinese Application No. 202080029089.8, dated Jun. 29, 2022, with an English translation.

(Continued)

*Primary Examiner* — Nelson J Nieves
(74) *Attorney, Agent, or Firm* — Birch, Stewart, Kolasch & Birch, LLP

(57) ABSTRACT

The present disclosure controls the supply of conditioned air to moderate the energy consumption by the heat source side in the supply of conditioned air using ducts in an air conditioning system. A heat exchanger unit includes a use side heat exchanger. A plurality of ducts distribute conditioned air that has passed through the use side heat exchanger of the heat exchanger unit. A plurality of fan units suction the conditioned air from the heat exchanger unit through the plurality of ducts, and supply the conditioned air to an air conditioned space. Each fan unit includes a fan motor that acts as an actuator configured to change an individual air supply amount of the conditioned air. A (Continued)

controller controls the plurality of fan motors to control the respective air supply amounts of the plurality of fan units.

20 Claims, 15 Drawing Sheets

(56) References Cited

U.S. PATENT DOCUMENTS

| | | | |
|---|---|---|---|
| 4,693,175 A * | 9/1987 | Hashimoto | F24F 3/167 |
| | | | 55/385.2 |
| 4,921,164 A * | 5/1990 | Gotou | F24F 11/72 |
| | | | 236/49.3 |
| 4,997,030 A | 3/1991 | Goto et al. | |
| 5,004,149 A | 4/1991 | Narikiyo et al. | |
| 5,025,638 A * | 6/1991 | Yamagishi | F24F 11/46 |
| | | | 62/227 |
| 5,076,346 A * | 12/1991 | Otsuka | F24F 3/044 |
| | | | 165/246 |
| 5,179,524 A | 1/1993 | Parker et al. | |
| 5,230,719 A * | 7/1993 | Berner | F24F 12/001 |
| | | | 165/4 |
| 5,305,953 A | 4/1994 | Rayburn et al. | |
| 5,344,069 A | 9/1994 | Narikiyo | |
| 5,417,077 A | 5/1995 | Jeffery et al. | |
| 5,417,368 A | 5/1995 | Jeffery et al. | |
| 5,701,750 A * | 12/1997 | Ray | F24F 11/77 |
| | | | 236/1 EA |
| 5,772,501 A | 6/1998 | Merry et al. | |
| 5,863,246 A | 1/1999 | Bujak, Jr. | |
| 5,979,167 A | 11/1999 | Kochavi et al. | |
| 6,601,168 B1 | 7/2003 | Stancil et al. | |
| 8,483,883 B1 * | 7/2013 | Watson | F24F 11/47 |
| | | | 236/92 R |
| 8,814,639 B1 | 8/2014 | Mecozzi | |
| 9,188,355 B1 * | 11/2015 | Allen | F24F 11/77 |
| 9,534,797 B2 * | 1/2017 | Tsutsumi | F24F 11/77 |
| 11,614,244 B2 | 3/2023 | Tanaka et al. | |
| 2005/0087614 A1 | 4/2005 | Ruise | |
| 2005/0155367 A1 * | 7/2005 | Shah | F24F 13/02 |
| | | | 165/205 |
| 2006/0105697 A1 | 5/2006 | Aronstam et al. | |
| 2006/0116067 A1 | 6/2006 | Federspiel | |
| 2006/0234621 A1 * | 10/2006 | Desrochers | F24F 3/044 |
| | | | 702/50 |
| 2007/0178823 A1 | 8/2007 | Aronstam et al. | |
| 2008/0242218 A1 | 10/2008 | Asano et al. | |
| 2010/0174414 A1 | 7/2010 | Takagi et al. | |
| 2010/0323604 A1 * | 12/2010 | Duffe | F24F 11/46 |
| | | | 454/258 |
| 2012/0192955 A1 | 8/2012 | Dazai | |
| 2012/0295530 A1 | 11/2012 | Ikeno et al. | |
| 2013/0265064 A1 | 10/2013 | Hamann et al. | |
| 2013/0281000 A1 * | 10/2013 | Newcomer | F24F 7/08 |
| | | | 454/237 |
| 2014/0273797 A1 * | 9/2014 | Jensen | F24F 7/065 |
| | | | 454/251 |
| 2015/0050876 A1 | 2/2015 | Sakai et al. | |
| 2015/0241076 A1 | 8/2015 | Eguchi et al. | |
| 2017/0023269 A1 | 1/2017 | Gevelber | |
| 2017/0219231 A1 | 8/2017 | Hui | |
| 2017/0298211 A1 | 10/2017 | Kobayashi | |
| 2017/0299211 A1 * | 10/2017 | Kobayashi | F24F 3/044 |
| 2017/0341094 A1 * | 11/2017 | Khalitov | F24F 11/0001 |
| 2018/0045424 A1 | 2/2018 | Yajima et al. | |
| 2018/0100087 A1 | 4/2018 | Komae et al. | |
| 2018/0363933 A1 * | 12/2018 | Ross | F24F 11/77 |
| 2019/0024929 A1 | 1/2019 | Funada et al. | |
| 2019/0145642 A1 * | 5/2019 | Heigl | F24F 13/10 |
| | | | 454/239 |
| 2019/0331358 A1 | 10/2019 | Ritmanich et al. | |
| 2020/0011562 A1 * | 1/2020 | Turney | G05B 13/021 |
| 2020/0340485 A1 * | 10/2020 | Fessel | F04D 27/004 |
| 2020/0340704 A1 * | 10/2020 | Ross | F24F 11/30 |
| 2021/0404695 A1 | 12/2021 | Saito et al. | |
| 2022/0412596 A1 * | 12/2022 | Ross | F24F 11/67 |

FOREIGN PATENT DOCUMENTS

| | | |
|---|---|---|
| DE | 20 2018 000 922 U1 | 5/2018 |
| EP | 2 781 846 A1 | 9/2014 |
| GB | 2528642 A | 2/2016 |
| JP | 59-184033 U | 12/1984 |
| JP | 60-21653 U | 2/1985 |
| JP | 61-71840 U | 5/1986 |
| JP | 1-300135 A | 12/1989 |
| JP | 4-32634 A | 2/1992 |
| JP | 4-116329 A | 4/1992 |
| JP | 5-157278 A | 6/1993 |
| JP | 5-180501 A | 7/1993 |
| JP | 5-223328 A | 8/1993 |
| JP | 6-50597 A | 2/1994 |
| JP | 6-159770 A | 6/1994 |
| JP | 7-280330 A | 10/1995 |
| JP | 8-42909 A | 2/1996 |
| JP | 8-261545 A | 10/1996 |
| JP | 10-220853 A | 8/1998 |
| JP | 10-253132 A | 9/1998 |
| JP | 11-132489 A | 5/1999 |
| JP | 2001-304614 A | 10/2001 |
| JP | 2002-162067 A | 6/2002 |
| JP | 2002-372277 A | 12/2002 |
| JP | 2005-326106 A | 11/2005 |
| JP | 2008-51466 A | 3/2008 |
| JP | 2009-145004 A | 7/2009 |
| JP | 2009-186062 A | 8/2009 |
| JP | 2010-108359 A | 5/2010 |
| JP | 2010-181046 A | 8/2010 |
| JP | 2010-210216 A | 9/2010 |
| JP | 2011-52905 A | 3/2011 |
| JP | 2012-77968 A | 4/2012 |
| JP | 2012-141088 A | 7/2012 |
| JP | 2012-154596 A | 8/2012 |
| JP | 2012-225640 A | 11/2012 |
| JP | 5426322 B2 | 2/2014 |
| JP | 2014-92293 A | 5/2014 |
| JP | 2014-95541 A | 5/2014 |
| JP | 2015-206519 A | 11/2015 |
| JP | 2018-100791 A | 6/2018 |
| JP | 2018-155444 A | 10/2018 |
| JP | 2019-11884 A | 1/2019 |
| JP | 2019-49387 A | 3/2019 |
| KR | 10-1128574 B1 | 3/2012 |
| TW | M566801 U | 9/2018 |
| TW | I651493 B | 2/2019 |
| WO | WO 2011/077007 A1 | 6/2011 |
| WO | WO 2017/159208 A1 | 9/2017 |
| WO | WO 2018/100657 A1 | 6/2018 |

OTHER PUBLICATIONS

Tragon, "Mine Ventilation Technology and Air Conditioning" Coal Industry Press, 1st Edition, May 2014, pp. 93-95 (6 pages total).
Extended European Search Report for European Application No. 24159348.2, dated May 10, 2024.
Extended European Search Report for European Application No. 19925110.9, dated May 9, 2022.
Extended European Search Report for European Application No. 20790587.8, dated Apr. 25, 2022.
Extended European Search Report for European Application No. 20790812.0, dated May 9, 2022.
Extended European Search Report for European Application No. 20791231.2, dated May 13, 2022.
Extended European Search Report for European Application No. 20791360.9, dated May 9, 2022.
Extended European Search Report for European Application No. 20794326.7, dated May 19, 2022.
International Preliminary Report on Patentability and English translation of the Written Opinion of the International Searching Author-

(56) References Cited

OTHER PUBLICATIONS ity for International Application No. PCT/JP2019/051585, dated Oct. 28, 2021.
U.S. Appl. No. 17/603,785, filed Oct. 14, 2021, Not Yet Assigned.
U.S. Appl. No. 17/603,772, filed Oct. 14, 2021, Not Yet Assigned.
U.S. Appl. No. 17/603,691, filed Oct. 14, 2021, Not Yet Assigned.
U.S. Appl. No. 17/603,758, filed Oct. 14, 2021, Not Yet Assigned.
U.S. Appl. No. 17/603,792, filed Oct. 14, 2021, Not Yet Assigned.
International Search Report for PCT/JP2019/051585 mailed on Jan. 28, 2020.
Machine translation of JPH-07280330-A, published on Oct. 27, 1995.

* cited by examiner

AIR CONDITIONING SYSTEM

TECHNICAL FIELD

The present disclosure relates to an air conditioning system provided with a plurality of fan units.

BACKGROUND ART

Among air conditioning systems of the prior art that provide air conditioning inside a building, there exists an air conditioning system that supplies conditioned air to a plurality of places inside a building using ducts, as described in Patent Literature 1 (JP H11-132489 A) for example.

SUMMARY OF THE INVENTION

Technical Problem

However, the air conditioning system described in Patent Literature 1 describes fan unit control content that does not account for energy saving on the heat source side.

In such an air conditioning system that uses ducts to supply conditioned air to a plurality of places inside a building, one challenge is to control the supply of conditioned air to moderate the energy consumption by the heat source side in the supply of conditioned air using ducts.

Solution to Problem

An air conditioning system according to a first aspect is an air conditioning system including a heat exchanger unit including a use side heat exchanger, and configured to generate conditioned air through heat exchange in the use side heat exchanger and supply the conditioned air to an air conditioned space through a plurality of distribution flow paths that communicate with the heat exchanger unit. The air conditioning system is provided with a controller, a plurality of ducts, and a plurality of fan units. The plurality of ducts are used to distribute conditioned air that has passed through the use side heat exchanger of the heat exchanger unit. The plurality of fan units are provided in correspondence with the plurality of ducts, and supply conditioned air from the heat exchanger unit to the air conditioned space through the plurality of ducts. A plurality of actuators are configured to be changeable the air supply amount of conditioned air to be supplied to the air conditioned space. Each of the plurality of ducts is disposed in one of a plurality of distribution flow paths. Each of the plurality of fan units includes a first fan, and is disposed in one of the plurality of distribution flow paths. Each of the plurality of actuators is disposed in one of the plurality of distribution flow paths. By controlling the plurality of actuators, the controller controls the air supply amount for each of the plurality of fan units.

In the air conditioning system according to the first aspect, because the controller controls the air supply amounts of the plurality of fan units, the air flow volume passing through the use side heat exchanger can be adjusted such that heat is exchanged efficiently in the use side heat exchanger, and energy consumption can be moderated.

An air conditioning system according to a second aspect is the system according to the first aspect, in which the controller controls the plurality of actuators in accordance with a plurality of instructions related to the air supply amounts of the plurality of fan units.

In the air conditioning system according to the second aspect, the controller controls the plurality of actuators according to instructions related to the air supply amounts with respect to the plurality of fan unit, and adjusts the air flow volume passing through the use side heat exchanger such that heat is exchanged efficiently in the use side heat exchanger to moderate energy consumption.

An air conditioning system according to a third aspect is the system according to the second aspect, in which the controller includes a main controller that transmits the plurality of instructions and at least one sub-controller that receives the plurality of instructions from the main controller. The at least one sub-controller controls the plurality of actuators on a basis of the plurality of instructions.

In the air conditioning system according to the third aspect, because the main controller controls the plurality of actuators through at least one sub-controller, the control by the main controller is simplified, making it easy to change the duct design and layout of the system.

An air conditioning system according to a fourth aspect is the system according to the third aspect, in which each of the plurality of actuators is a fan motor that drives the first fan.

An air conditioning system according to a fifth aspect is the system according to the fourth aspect, in which the at least one sub-controller is a plurality of sub-controllers, each of the plurality of fan units includes an air flow volume detector that detects the air flow volume passing through each unit, and each of the plurality of sub-controllers controls a rotation speed of the fan motor such that the air flow volume detected by the air flow volume detector approaches the air supply amounts indicated by the instructions from the main controller.

In the air conditioning system according to the fifth aspect, the air supply amount of each fan unit can be controlled by each sub-controller reliably.

An air conditioning system according to a sixth aspect is the system according to any one of the first to fifth aspects in which the controller calculates the air supply amounts of each of the fan units from a temperature difference between an indoor air temperature adjusted by each of the plurality of fan units and a set temperature, and a fan temperature, and determines the plurality of instructions on a basis of the calculated air supply amounts.

In the air conditioning system according to the sixth aspect, temperature control of the air conditioned space is achieved easily by changing the air supply amount.

An air conditioning system according to a seventh aspect is the system according to any one of the first to sixth aspects, in which the heat exchanger unit includes a second fan, and the controller controls the second fan on a basis of the air supply amounts of the plurality of fan units.

In the air conditioning system according to the seventh aspect, the controller can control the second fan to an appropriate value to match the air supply amounts of the plurality of first fans, and moderate the energy consumption of the air conditioning system.

An air conditioning system according to an eighth aspect is the system according to the first or second aspect, in which the heat exchanger unit includes a second fan, the controller includes a main controller that controls the plurality of actuators in accordance with a plurality of instructions related to the air supply amounts of the plurality of fan units, and a plurality of sub-controllers that receive the plurality of instructions transmitted by the main controller and control the plurality of actuators, and the main controller controls the second fan to be a predetermined output with respect to a total combined air supply amount indicated by the plurality of instructions.

In the air conditioning system according to the eighth aspect, the controller easily controls the second fan to set the output of the second fan to an appropriate value to match the air supply amounts of the plurality of first fans.

An air conditioning system according to a ninth aspect is the system according to the first or second aspect, in which the controller includes at least one sub-controller that controls the plurality of actuators and a main controller that communicates with the at least one sub-controller, and the main controller is disposed in the heat exchanger unit.

In the air conditioning system according to the ninth aspect, because the main controller is disposed in the heat exchanger unit, it is sufficient to construct a network connecting the main controller and the plurality of actuators to match the flow of conditioned air supplied from the heat exchanger unit, and therefore the network for transmitting the instructions from the main controller can be constructed easily using the heat exchanger unit as the starting point.

An air conditioning system according to a 10th aspect is the system according to the first or second aspect, in which the controller includes at least one sub-controller that controls the plurality of actuators and a main controller that communicates with the at least one sub-controller, and the main controller is disposed in one of the plurality of fan units.

In the air conditioning system according to the 10th aspect, because the main controller is disposed in one of the plurality of fan units, an air conditioning system including the main controller in one of the plurality of fan units can be formed by connecting a network of the plurality of fan units, and the air conditioning system can be constructed easily.

Note that when configuring the air conditioning system according to the 10th aspect, in the case where two or more main controllers exist, it is sufficient for at least one of the two or more main controllers to exist in one of the plurality of fan units.

An air conditioning system according to an 11th aspect is the system according to the first or second aspect, in which the controller includes at least one sub-controller that controls the plurality of actuators and a main controller that communicates with the at least one sub-controller, and the main controller is disposed in a location other than the heat exchanger unit or the plurality of fan units.

In the air conditioning system according to the 11th aspect, because the main controller is disposed in a location other than the heat exchanger unit or the plurality of fan units, the installation of the main controller is not restricted by the heat exchanger unit and the plurality of fans units, thereby increasing the degree of freedom in the installation of the main controller and making it easy to handle the main controller.

An air conditioning system according to a 12th aspect is the system according to any one of the first and the ninth to 11th aspects, in which air passing through the use side heat exchanger is produced by only air suction force of the plurality of fan units.

The air conditioning system according to the 12th aspect is configured to generate an air flow passing through the use side heat exchanger using only the air suction force of the plurality of fan units, and a power source for generating an air flow in the heat exchanger unit does not have to be provided, therefore costs can be reduced compared to the case of providing a power source for generating an air flow in the heat exchanger unit.

An air conditioning system according to a 13th aspect is the system according to any one of the first and the ninth to 12th aspects, in which the heat exchanger unit includes at least one of a heat medium temperature sensor that detect the temperature of a heat medium flowing through the use side heat exchanger or a pipe connected to the use side heat exchanger, and an intake temperature sensor that detects the temperature of air suctioned into the heat exchanger unit. The heat medium temperature sensor and/or the intake temperature sensor is connected to the main controller.

An air conditioning system according to a 14th aspect is the system according to the 13th aspect, in which the main controller uses a detected value from at least one of the heat medium temperature sensor and the intake temperature sensor to determine an instruction related to increasing or decreasing the air supply amounts.

In the air conditioning system according to the 14th aspect, a detected value from at least one of the heat medium temperature sensor and the intake temperature sensor is used to determine the instruction related to increasing or decreasing the air supply amount, thereby making it easy for the main controller to output instructions causing the plurality of fan units to supply air to meet the operating condition of the heat exchanger unit.

An air conditioning system according to a 15th aspect is the system according to any one of the first and the ninth to 14th aspects, further including a remote controller including a set temperature function that sets a temperature of the air conditioned space and a function that detects an indoor temperature of the air conditioned space, in which the main controller uses the set temperature of the remote controller and the indoor temperature detected by the remote controller to determine an instruction related to increasing or decreasing the air supply amounts.

In the air conditioning system according to the 15th aspect, because the main controller uses the set temperature of the remote controller and the indoor temperature detected by the remote controller to determine the instruction related to increasing or decreasing the air supply amount, the main controller can issue an instruction causing the temperature of the air conditioned space to approach the set temperature.

An air conditioning system according to a 16th aspect is the system according to any one of the first and ninth to fifteenth aspects, further including: a compressor that compresses a refrigerant; a heat source side heat exchanger that exchanges heat with the refrigerant circulating through the use side heat exchanger; and an expansion valve that causes the refrigerant flowing between the use side heat exchanger and the heat source side heat exchanger to expand, in which the main controller is connected to the compressor and/or the expansion valve to control a system operation.

In the air conditioning system according to the 16th aspect, because the main controller is connected to a compressor and/or an expansion valve to control system operation, the system operation can be controlled appropriately by increasing or decreasing the air supply amount and controlling the rotation speed of the compressor and/or the opening degree of the expansion valve to achieve a refrigerant circulation rate derived by arithmetic operations for example, and the increasing or decreasing of the air supply amount can be controlled while performing a refrigeration cycle suitable for the refrigerant circulating through the use side heat exchanger and the heat source side heat exchanger.

An air conditioning system according to a 17th aspect is the system according to any one of the first and the ninth to 15th aspects, further including: a compressor that compresses a refrigerant; a heat source side heat exchanger that exchanges heat with the refrigerant circulating through the use side heat exchanger; and an expansion valve that causes the refrigerant flowing between the use side heat exchanger and the heat source side heat exchanger to expand, in which the main controller calculates an operating frequency of the compressor and/or an opening degree of the expansion valve from a total air flow volume of air passing through the use side heat exchanger obtained by adding up the air supply amounts transmitted from all fan units, and the temperature of air suctioned into the heat exchanger unit.

An air conditioning system according to a 18th aspect is the system according to any one of the first and the ninth to 15th aspects, further including: a compressor that compresses a refrigerant; a heat source side heat exchanger that exchanges heat with the refrigerant circulating through the use side heat exchanger; and an expansion valve that causes the refrigerant flowing between the use side heat exchanger and the heat source side heat exchanger to expand, in which the main controller controls actuators on the basis of information indicating the operating frequency of the compressor and/or an opening degree of the expansion valve.

In the air conditioning system according to the 18th aspect, because the main controller controls the actuators on the basis of the rotation speed of the compressor and/or the opening degree of the expansion valve, the increasing or decreasing of the air supply amount can be controlled while performing a refrigeration cycle suitable for the refrigerant circulating through the use side heat exchanger and the heat source side heat exchanger.

An air conditioning system according to a 19th aspect is the system according to any one of the first and the ninth to 18th aspects, in which the main controller controls the air flow volume passing through the use side heat exchanger with an actuator in at least one duct among the plurality of ducts while adjusting an actuator in the at least one duct such that the conditioned air proceeding from the heat exchanger unit toward the air conditioned space in the at least one duct does not flow back.

In the air conditioning system according to the 19th aspect, because the main controller controls the air flow volume passing through the use side heat exchanger with an actuator in at least one duct while adjusting an actuator in at least one duct such that conditioned air proceeding from the heat exchanger unit toward the plurality of outlets in at least one duct does not flow back, a drop in heat exchange efficiency due to backflow of the conditioned air in the at least one duct can be prevented.

An air conditioning system according to a 20th aspect is the system according to the 19th aspect, further including: a plurality of dampers or a plurality of air deflectors, in which each of the plurality of dampers or the plurality of air deflectors is disposed in one of the plurality of distribution flow paths, the plurality of actuators include a plurality of motors that drive the plurality of dampers or the plurality of air deflectors, and the main controller adjusts an opening degree of a damper or an air deflector in at least one duct among the plurality of ducts such that the conditioned air proceeding from the heat exchanger unit toward the air conditioned space in the at least one duct does not flow back.

In the air conditioning system according to the 20th aspect, because the conditioned air is controlled not to flow back in the at least one duct by adjusting the opening degree of a damper or an air deflector, a drop in heat exchange efficiency due to backflow of the conditioned air in the at least one duct can be prevented easily.

The air conditioning system according to the 21st aspect is the system according to the 19th or 20th aspect, in which the plurality of actuators include a plurality of fan motors configured to change an individual air supply amount of each of the plurality of fan units, and the main controller adjusts a rotation speed of a fan motor in at least one duct among the plurality of ducts such that the conditioned air proceeding from the heat exchanger unit toward the air conditioned space in the at least one duct does not flow back.

In the air conditioning system according to the 21st aspect, because the conditioned air is controlled not to flow back in the at least one duct by adjusting the rotation speed of the fan motor in the at least one duct, a drop in heat exchange efficiency due to backflow of the conditioned air in the at least one duct can be prevented easily.

DESCRIPTION OF EMBODIMENTS

First Embodiment (1) Overall Configuration

Figure 1:
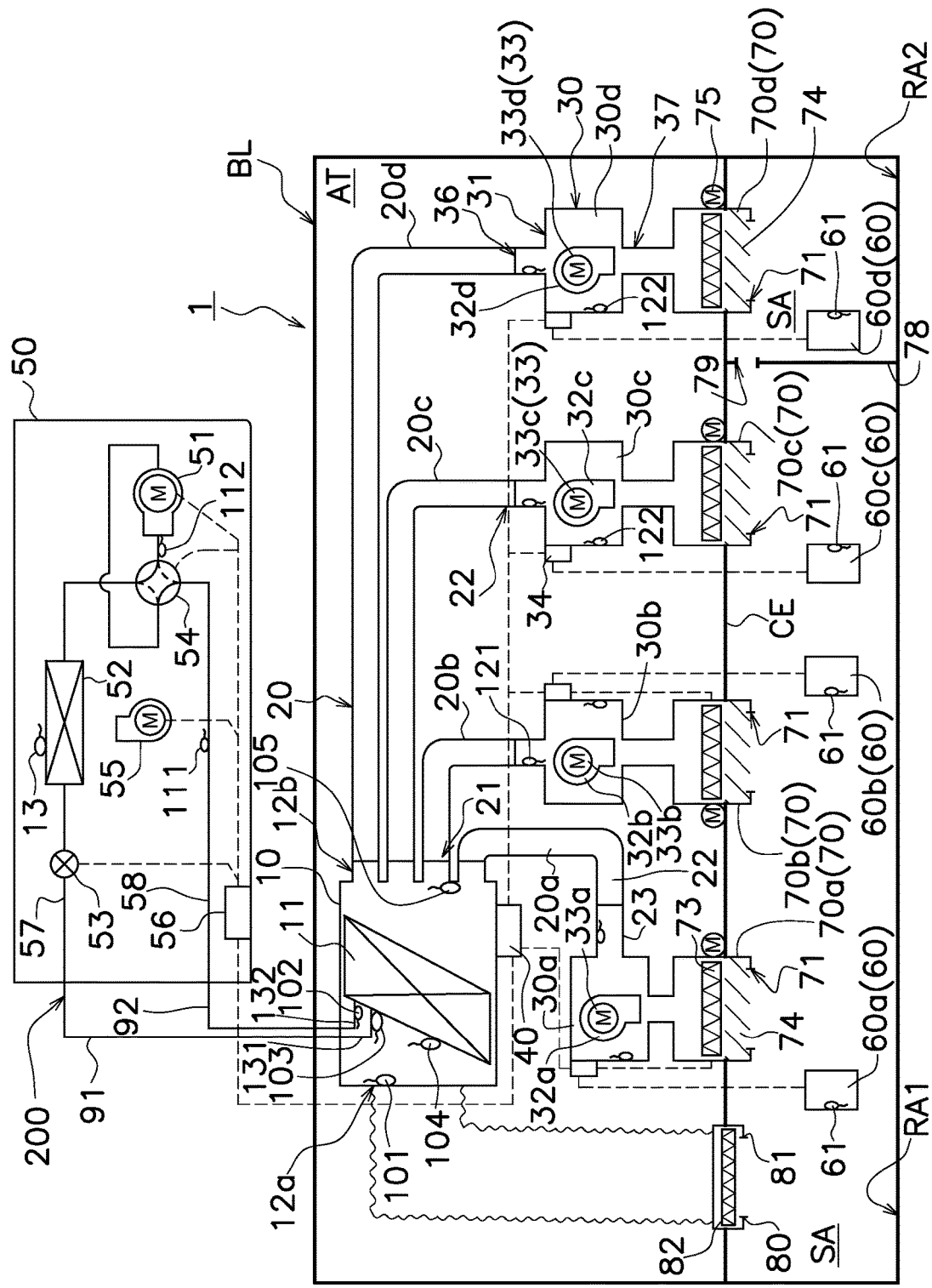
FIG. 1 is a schematic diagram illustrating an overview of the configuration of an air conditioning system.

An air conditioning system 1 illustrated in FIG. 1 supplies conditioned air to an air conditioned space SA. Examples of the air conditioned space SA include rooms RA1 and RA2 in a building BL, or the like. The rooms RA1 and RA2 are partitioned by a partitioning wall 78. Here, descriptions will be given in a case where the air conditioned spaces SA are two rooms RA1 and RA2, however, the air conditioning system 1 may be provided in corresponding to rooms in various size, various shape, and various numbers. It is preferable that the air conditioned spaces SA to which the air conditioning system 1 supplies conditioned air be surrounded (front and back, up and down, and left and right) by wall surfaces like the rooms RA1 and RA2. Note that the air conditioned spaces SA are not limited to the rooms RA1 and RA2, but may be, for example, corridors, stairs, and entrances. The air conditioned space SA may be a single space such as a large hall, or a plurality of spaces such as a plurality of rooms partitioned from each other, for example.

Figure 4:
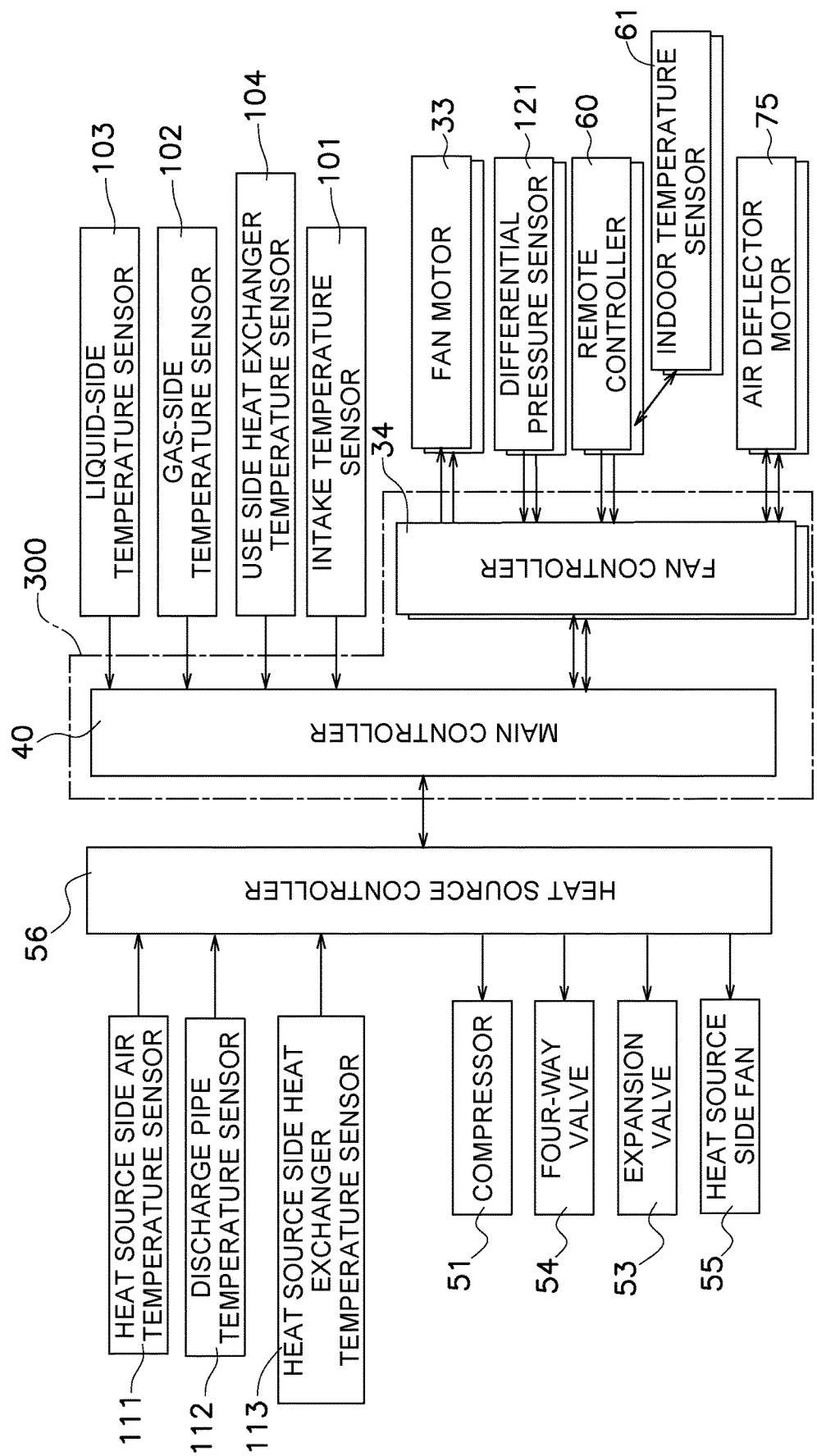
FIG. 4 is a block diagram illustrating one example of a control subsystem.

As illustrated in FIG. 1, the air conditioning system 1 is provided with a heat exchanger unit 10, a plurality of ducts 20, a plurality of fan units 30, and a controller 300 (see FIG. 4). The air conditioning system 1 generates conditioned air through heat exchange in the heat exchanger unit 10, and supplies the generated conditioned air to the air conditioned space SA through a plurality of distribution flow paths. Each of the plurality of ducts 20 is disposed in one of the plurality of distribution flow paths. Each of the plurality of fan units 30 is disposed in one of the plurality of distribution flow paths. Note that when distinguishing one among the plurality of ducts 20, a letter of the alphabet is appended, like the duct 20a. Here, four ducts 20a to 20d are illustrated as the ducts 20. Also, four fan units 30a to 30d are illustrated as the fan units 30. Also, four outlet units 70a to 70d and four remote controllers 60a to 60d are illustrated as the outlet units 70 and the remote controllers 60, respectively. Each of the plurality of outlet units 70a to 70d is disposed in one of the plurality of distribution flow paths.

The heat exchanger unit 10 includes a use side heat exchanger 11. The heat exchanger unit 10 has a function to generate conditioned air through heat exchange in the use side heat exchanger 11. One end 21 of each of the plurality of ducts 20 is connected to the heat exchanger unit 10. The plurality of ducts 20 are a plurality of pipes that send conditioned air generated by the heat exchanger unit 10, and include a function of distributing the conditioned air. In other words, the plurality of ducts 20 are used to distribute conditioned air that has passed through the use side heat exchanger 11 of the heat exchanger unit 10.

The plurality of fan units 30 are connected to another end 22 of the plurality of ducts 20. Here, the fan unit 30a is connected to the corresponding duct 20a connected to the heat exchanger unit 10, for example. Similarly, the fan units 30b to 30d are also connected to the corresponding ducts 20b to 20d, respectively. Although a case where each duct 20 has a single one end 21 and a single other end 22 is described herein, a single duct 20 may also branch from a single one end 21 into a plurality of other ends 22, and the fan unit 30 may be connected respectively to each of the plurality of other ends 22 branching in this way. Also, the fan units 30a to 30d are connected to the outlet units 70a to 70d and the remote controllers 60a to 60d.

The air conditioning system 1 includes a plurality of air outlets 71 disposed in the air conditioned space SA. Each fan unit 30 supplies conditioned air to each corresponding air outlet 71. To supply conditioned air to each air outlet 71, each fan unit 30 draws in conditioned air from the heat exchanger unit 10 through each duct 20. To draw in conditioned air, each fan unit 30 includes a fan 32 inside a casing 31 of each fan unit 30. Each fan 32 sends air from the other end 22 of each duct 20 toward each air outlet 71. One or a plurality of fans 32 may be included in each fan unit 30. Here, one each of the fans 32a to 32d is respectively provided in the casing 31 of each of the fan units 30a to 30d.

Each fan unit 30 is configured to change the individual air supply amounts of the conditioned air to be supplied to each air outlet 71 with an actuator. The air supply amount is the amount of air supplied to the air conditioned space SA per unit time. Here, a fan motor 33 with a variable rotation speed is the actuator. Here, four fan motors 33a to 33d are configured such that the rotation speed can be changed individually, and by causing the fan motors 33a to 33d to change the respective rotation speed individually, the fan units 30a to 30d can change the air supply amounts individually.

By controlling the plurality of actuators, the controller 300 controls the air supply amount of each of the plurality of fan units 30. More specifically, the main controller 40 of the controller 300 controls the plurality of actuators in accordance with a plurality of instructions related to the air supply amounts of the plurality of fan units 30. Consequently, the air conditioning system 1 according to the first embodiment outputs an instruction related to increasing or decreasing the air supply amount from the main controller 40 to the plurality of actuators. The "instruction related to increasing or decreasing the supply air flow volume" is not limited to the case causing the supply air flow volume to increase or decrease by outputting an instruction causing the parameter of the supply air flow volume to increase or decrease directly. For example, in the case where the supply air flow volume increases or decreases as a result of outputting an instruction causing a wind speed parameter of the fan units 30 to increase or decrease, and the wind speed increases or decreases according to the increase or decrease of the wind speed parameter, the instruction causing the wind speed parameter to increase or decrease is included in the "instruction related to increasing or decreasing the supply air flow volume". Also, in the case where the supply air flow volume increases or decreases as a result of outputting an instruction causing a parameter of differential pressure in a predetermined location in the heat exchanger unit 10, the ducts 20, and the fan units 30 to increase or decrease, and the differential pressure parameter increases or decreases, the instruction causing the differential pressure parameter to increase or decrease is included in the "instruction related to increasing or decreasing the supply air flow volume". As described above, not only the case of issuing an instruction for directly increasing or decreasing the supply air flow volume but also the case of issuing an instruction for indirectly increasing or decreasing the supply air flow volume are included in the "instruction related to increasing or decreasing the supply air flow volume". A control system of the air conditioning system 1, including the main controller 40 of the controller 300, will be described later.

In addition to the above configuration, the air conditioning system 1 is provided with a heat source unit 50, the remote controllers 60, the outlet units 70, an inlet unit 80, and various sensors. The sensors provided in the air conditioning system 1 will be described later.

(2) Detailed Configuration (2-1) Heat Exchanger Unit 10

The heat exchanger unit 10 is provided with the use side heat exchanger 11, a hollow housing 12 that houses the use side heat exchanger 11, and the main controller 40. The housing 12 includes an air inflow port 12a connected to an inlet 81 and a plurality of air outflow ports 12b connected to the plurality of ducts 20. Here, the case of a single air inflow port 12a is illustrated, but a plurality of air inflow ports 12a may also be provided. The use side heat exchanger 11 is a fin-and-tube heat exchanger, for example, and causes heat to be exchanged between air passing between heat transfer fins and a refrigerant flowing through heat transfer tubes. When air suctioned from the air inflow port 12a passes through the use side heat exchanger 11, the air exchanges heat with the refrigerant (heat medium) passing through the use side heat exchanger 11, and conditioned air is generated. The conditioned air generated by the use side heat exchanger 11 is suctioned into each of the ducts 20a to 20b from the air outflow ports 12b.

The heat exchanger unit 10 is not provided with a fan. The reason why the heat exchanger unit 10 can suction air from the air inflow port 12a is that negative pressure exists inside the heat exchanger unit 10 due to the plurality of ducts 20 suctioning air from all of the plurality of air outflow ports 12b.

(2-2) Ducts 20

The plurality of ducts 20 including the function of distributing conditioned air are connected to the plurality of air outflow ports 12b of the heat exchanger unit 10 and to the plurality of fan units 30. Here, the case where each of the fan units 30 and each of the outlet units 70 are connected directly is described, but the ducts 20 may also be disposed between the fan units 30 and the outlet units 70, such that the fan units 30 and the outlet units 70 are connected by the ducts 20.

Metal pipes having a fixed shape or pipes having a freely bendable material may be used as the ducts 20. By joining such ducts 20 together, various arrangements of the heat exchanger unit 10, the plurality of fan units 30, and the plurality of outlet units 70 are possible.

Figure 2:
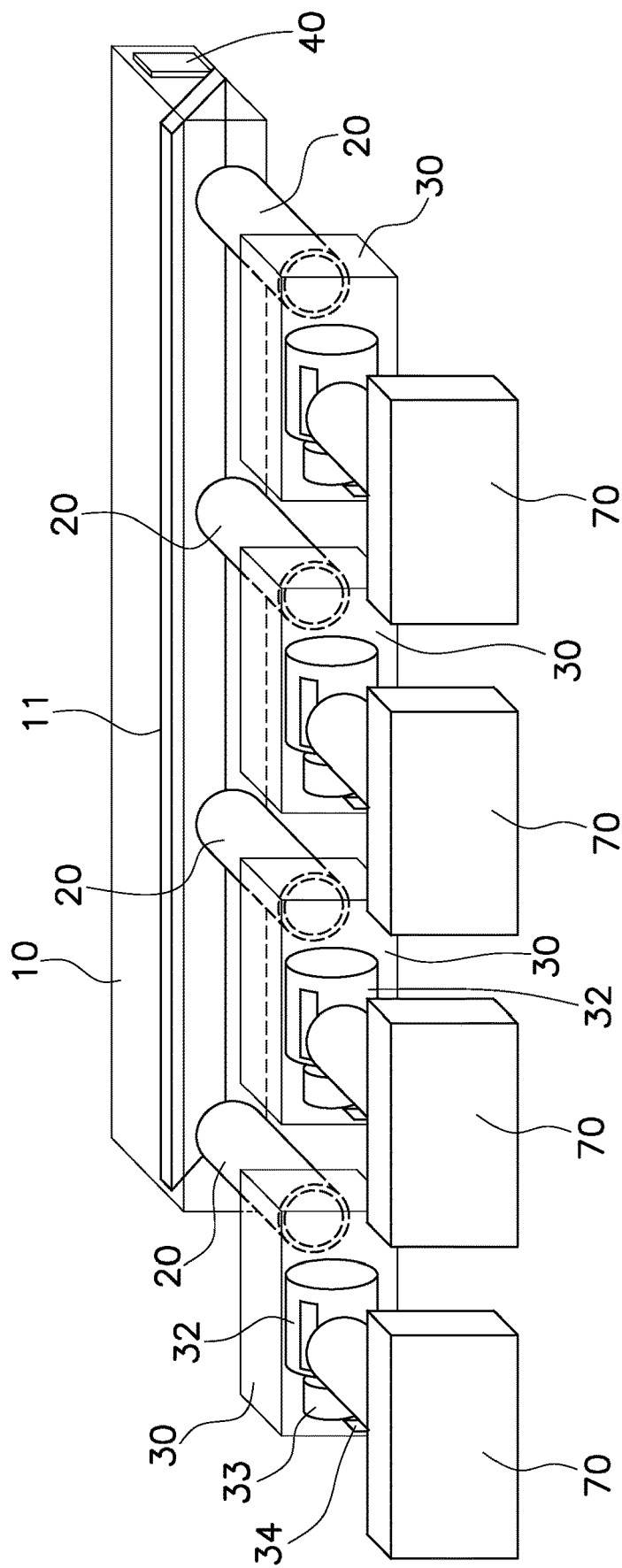
FIG. 2 is a schematic perspective view of one example of connecting a heat exchanger unit, ducts, fan units, and outlet units.

In FIG. 2, the heat exchanger unit 10, four fan units 30, and four outlet units 70 connected in a ceiling-concealed space AT are schematically illustrated. The heat exchanger unit 10, fan units 30, and outlet units 70 configured in this way are easily formed thinly, and therefore may also be disposed in a space under the floor of rooms RM1 and RM2.

(2-3) Fan Unit 30

For the fan 32 provided in each fan unit 30, a centrifugal fan may be used, for example. The centrifugal fan used as the fan 32 may be a sirocco fan, for example. The casing 31 provided in each fan unit 30 includes an intake port 36 and an exhaust port 37. The other end 22 of each duct 20 is connected to the intake port 36 of each casing 31. The outlet of each fan 32 and the corresponding outlet unit 70 are connected to the exhaust port 37 of each casing 31. Conditioned air blown out from the fan 32 passes through the outlet unit 70 and is blown out from the air outlet 71.

A fan controller 34 is attached to the casing 31. Here, all of the fan controllers 34 are connected to the main controller 40.

Figure 3:
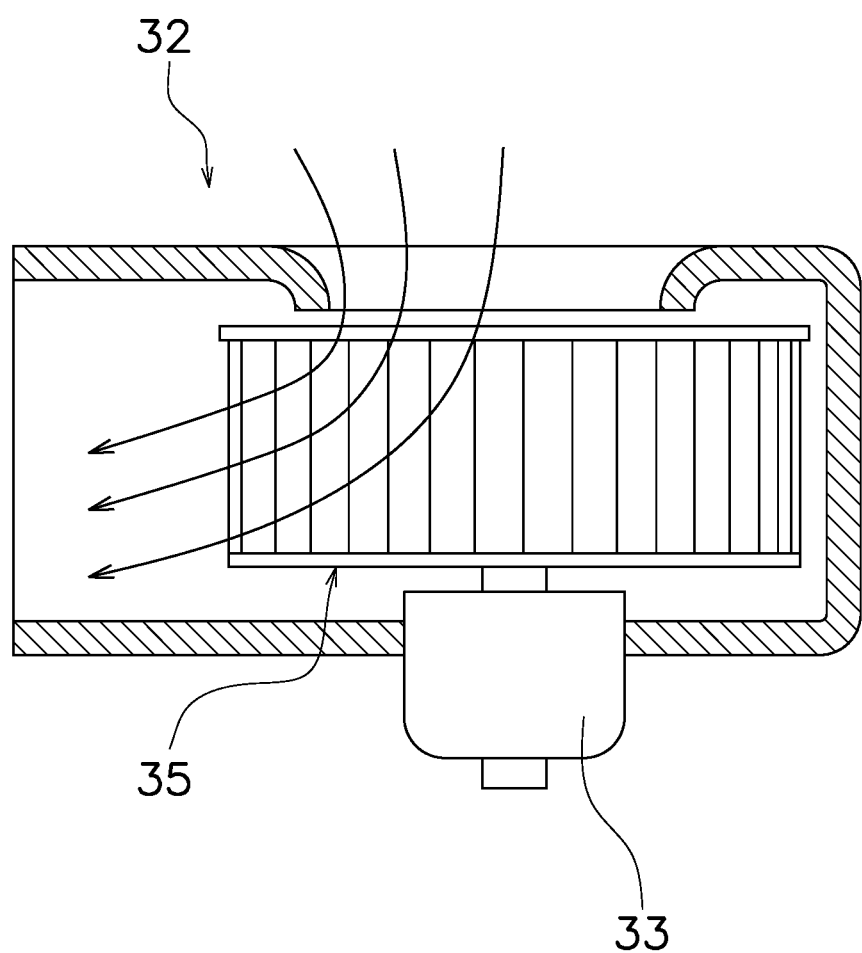
FIG. 3 is a cross section view of one example of a fan in a fan unit.

In FIG. 3, a sirocco fan is illustrated as one example of the fan 32. The rotation speed of the fan motor 33 that causes a fan rotor 35 of the fan 32 to rotate can be changed. Consequently, by changing the rotation speed of the fan motor 33, the amount of air supplied by the fan 32 can be changed. The fan controller 34 is connected to the fan motor 33, and is capable of controlling the rotation speed of the fan motor 33.

Each fan unit 30 is provided with a differential pressure sensor 121 that functions as an air flow volume detector described later, and each fan controller 34 is capable of automatically correcting the rotation speed of the fan motor 33 needed to produce the necessary air supply amount, even if the air resistance occurring in the ducts 20 to each fan unit 30 is different depending on the duct length. However, such a correction function does not have to be included in the fan unit 30 in some cases.

(2-4) Heat Source Unit 50

The heat source unit 50 supplies heat energy demanded by the heat exchange in the use side heat exchanger 11 of the heat exchanger unit 10. The air conditioning system 1 illustrated in FIG. 1 causes a refrigerant to circulate between the heat source unit 50 and the heat exchanger unit 10, and thereby performs a vapor compression refrigeration cycle. The heat source unit 50 and the heat exchanger unit 10 form a refrigeration cycle apparatus that performs the vapor compression refrigeration cycle. In the example illustrated in FIG. 1, the heat source unit 50 is disposed on the outside of the building BL and treats outdoor air as the heat source, but the installation location of the heat source unit 50 is not limited to the outside of the building BL.

The heat source unit 50 is provided with a compressor 51, a heat source side heat exchanger 52, an expansion valve 53, a four-way valve 54, a heat source side fan 55, a heat source controller 56, and in-unit refrigerant pipes 57 and 58. A discharge port of the compressor 51 is connected to a first port of the four-way valve 54, and a suction port of the compressor 51 is connected to a third port of the four-way valve 54. The compressor 51 compresses a refrigerant in a gaseous state (hereinafter also referred to as a gas refrigerant) or a refrigerant in a gas-liquid two-phase state suctioned from the suction port, and discharges the compressed refrigerant from the discharge port. The compressor 51 includes a built-in compressor motor whose rotation speed (or operating frequency) can be changed by inverter control, for example. The compressor 51 is capable of changing the amount of discharged refrigerant per unit time by changing the operating frequency.

The second port of the four-way valve 54 is connected to one of the ports of the heat source side heat exchanger 52, while the fourth port is connected to the in-unit refrigerant pipe 58. During the cooling operation, as illustrated by the solid lines, the four-way valve 54 causes the refrigerant to flow from the first port to the second port to send the refrigerant discharged from the compressor 51 to the heat source side heat exchanger 52, and causes the refrigerant to flow from the fourth port to the third port to send the refrigerant from the use side heat exchanger 11 through an in-unit refrigerant pipe 132, a connection pipe 92, and the in-unit refrigerant pipe 58 to the suction port of the compressor 51. During the heating operation, as illustrated by the dashed lines, the four-way valve 54 causes the refrigerant to flow from the first port to the fourth port to send the refrigerant discharged from the compressor 51 through the in-unit refrigerant pipe 58, the connection pipe 92, and the in-unit refrigerant pipe 132 to the use side heat exchanger 11, and causes the refrigerant to flow from the second port to the third port to send the refrigerant from the heat source side heat exchanger 52 to the suction port of the compressor 51. The heat source side heat exchanger 52 is a fin-and-tube heat exchanger, for example, and causes heat to be exchanged between air passing between heat transfer fins and a refrigerant flowing through heat transfer tubes.

The other port of the heat source side heat exchanger 52 is connected to one end of the expansion valve 53, and the other end of the expansion valve 53 is connected to one of the ports of the use side heat exchanger 11 through the in-unit refrigerant pipe 57, a connection pipe 91, and an in-unit refrigerant pipe 131. The other port of the use side heat exchanger 11 is connected to the in-unit refrigerant pipe 132.

By connecting the heat source unit 50 and the heat exchanger unit 10 as above, a refrigerant circuit 200 is formed. During the cooling operation in the refrigerant circuit 200, a refrigerant flows through the compressor 51, the four-way valve 54, the heat source side heat exchanger 52, the expansion valve 53, the use side heat exchanger 11, the four-way valve 54, and the compressor 51 in the above order. Also, during the heating operation in the refrigerant circuit 200, a refrigerant flows through the compressor 51, the four-way valve 54, the use side heat exchanger 11, the expansion valve 53, the heat source side heat exchanger 52, the four-way valve 54, and the compressor 51 in the above order.

(2-4-1) Circulation of Refrigerant During Cooling Operation

During the cooling operation, a gas refrigerant compressed by the compressor 51 is sent to the heat source side heat exchanger 52 through the four-way valve 54. The refrigerant transfers heat in the heat source side heat exchanger 52 to air sent by the heat source side fan 55, expands and is decompressed by the expansion valve 53, and is sent to the use side heat exchanger 11 by passing through the in-unit refrigerant pipe 57, the connection pipe 91, and the in-unit refrigerant pipe 131. The low-temperature and low-pressure refrigerant sent from the expansion valve 53 exchanges heat in the use side heat exchanger 11 to take heat from air sent from the inlet 81. The gas refrigerant or two-phase gas-liquid refrigerant that has exchanged heat in the use side heat exchanger 11 passes through the in-unit refrigerant pipe 132, the connection pipe 92, the in-unit refrigerant pipe 58, and the four-way valve 54, and is suctioned into the compressor 51. The conditioned air that has lost heat in the use side heat exchanger 11 passes through the plurality of ducts 20, the plurality of fan units 30, and the plurality of air outlets 71, and is blown out into the rooms RA1 and RA2, thereby cooling the rooms RA1 and RA2.

During the cooling operation, to keep liquid compression from occurring in the compressor 51, a control is performed to adjust the opening degree of the expansion valve 53 such that the degree of superheating of the refrigerant suctioned into the suction port of the compressor 51 matches a target degree of superheating, for example. In addition, to enable processing of a cooling load while such adjustment of the opening degree of the expansion valve 53 is being performed, a control to change the operating frequency of the compressor 51 is performed. The degree of superheating is calculated by subtracting the evaporation temperature of the refrigerant inside the use side heat exchanger 11 from the temperature of the gas refrigerant sent out from the use side heat exchanger 11, for example.

During the heating operation, a gas refrigerant compressed by the compressor 51 is sent to the use side heat exchanger 11 through the four-way valve 54 and the in-unit refrigerant pipe 58, the connection pipe 92, and the in-unit refrigerant pipe 132. The refrigerant exchanges heat in the use side heat exchanger 11 to transfer heat to air sent from the inlet 81. The refrigerant that has exchanged heat in the use side heat exchanger 11 is sent to the expansion valve 53 through the in-unit refrigerant pipe 131, the connection pipe 91, and the in-unit refrigerant pipe 57. The low-temperature and low-pressure refrigerant expands and is decompressed by the expansion valve 53, is sent to the heat source side heat exchanger 52 and exchanges heat in the heat source side heat exchanger 52 to obtain heat from air sent by the heat source side fan 55. The gas refrigerant or two-phase gas-liquid refrigerant that has exchanged heat in the heat source side heat exchanger 52 passes through the four-way valve 54 and is suctioned into the compressor 51. The conditioned air that has gained heat in the use side heat exchanger 11 passes through the plurality of ducts 20, the plurality of fan units 30, and the plurality of air outlets 71, and is blown out into the rooms RA1 and RA2, thereby heating the rooms RA1 and RA2.

During the heating operation, a control is performed to adjust the opening degree of the expansion valve 53 such that the degree of subcooling of the refrigerant at the exit port of the use side heat exchanger 11 (the in-unit refrigerant pipe 131) matches a target degree of superheating, for example. In addition, to enable processing of a heating load while such adjustment of the opening degree of the expansion valve 53 is being performed, a control to change the operating frequency of the compressor 51 is performed. The degree of subcooling of the use side heat exchanger 11 is calculated by subtracting the temperature of the liquid refrigerant exiting the use side heat exchanger 11 from the condensation temperature of the refrigerant inside the use side heat exchanger 11, for example.

The outlet unit 70 is attached to a ceiling CE with the air outlet 71 pointed downward, for example. Here, a case in which the outlet unit 70 is attached to the ceiling CE is illustrated as an example, but the outlet unit 70 may also be attached to a wall for example, and the installation location of the outlet unit 70 is not limited to the ceiling CE.

(2-5) Outlet Unit 70

The outlet unit 70 is provided with an air filter 73 inside a hollow casing 72. The outlet units 70a to 70d are connected to the fan units 30a to 30d, respectively. Conditioned air sent from the fan unit 30 passes through the air filter 73 and is blown out from the air outlet 71. Here, a case where the outlet unit 70 is provided with the air filter 73 is described, but the configuration of the outlet unit 70 does not have to include the air filter 73.

In addition, the outlet unit 70 is provided with an air deflector 74 inside the hollow casing 72. The outlet unit 70 is provided with an air deflector motor 75 for driving the air deflector 74. Here, the air deflector motor 75 for driving the air deflector 74 is an actuator. The air deflector 74 can be moved by the air deflector motor 75 and thereby adjust the wind direction. Furthermore, the air deflector 74 may also be moved to a position that closes off the air outlet 71. The air deflector motor 75 is connected to the fan controller 34 of the fan unit 30, for example. Consequently, the fan controller 34 is capable of controlling the wind direction and the opening or closing of the air outlet 71. Here, a case where the outlet unit 70 is provided with the air deflector 74 and the air deflector motor 75 is described, but the configuration of the outlet unit 70 does not have to include the air deflector 74 and the air deflector motor 75.

The inlet unit 80 is attached to the wall of the building BL with the inlet 81 pointed toward outside the building BL, for example. Here, the case where the inlet unit 80 is attached to the building BL is illustrated as an example, but the inlet unit 80 may also be attached to the building BL for example, and the installation location of the inlet unit 80 is not limited to the wall of the building BL.

The inlet unit 80 is provided with an air filter 83 inside a hollow casing 82. Air sent to the heat exchanger unit 10 is taken in from the inlet 81 through the air filter 83. Here, a case where the inlet unit 80 is provided with the air filter 83 is described, but the configuration of the inlet unit 80 does not have to include the air filter 83.

(2-6) Control Subsystem

As illustrated in FIG. 4, the main controller 40 is connected to the plurality of fan controllers 34 and the heat source controller 56. The heat source controller 56 is configured, for example, by various circuits provided on a printed circuit board connected to various equipment in the heat source unit 50, and controls the various equipment in the heat source unit 50 such as the compressor 51, the expansion valve 53, the four-way valve 54, and the heat source side fan 55. Also, the main controller 40 is connected to each remote controller 60 through each fan controller 34. The remote controllers 60a to 60d correspond to the outlet units 70a to 70d, and are connected to the fan units 30a to 30d. Here, a case where the remote controller 60 is connected to the main controller 40 through the fan controller 34 is described, but the remote controller 60 may also be connected to the main controller 40 directly. Here, a case where the main controller 40, the plurality of fan controllers 34, the heat source controller 56, and the plurality of remote controllers 60 are connected in a wired manner is illustrated, but some or all of the controllers may also be connected by wireless communication.

The main controller 40, the plurality of fan controllers 34, the heat source controller 56, and the plurality of remote controllers 60 are achieved by a computer, for example. The computer forming the main controller 40, the plurality of fan controllers 34, the heat source controller 56, and the plurality of remote controllers 60 is provided with a control computing device and a storage device. A processor such as a CPU or a GPU can be used as the control computing device. The control computing device reads a program stored in the storage device and performs predetermined image processing and arithmetic processing in accordance with the program. Further, the control computing device can write an arithmetic result to the storage device and read information stored in the storage device in accordance with the program. However, the main controller 40, the plurality of fan controllers 34, the heat source controller 56, and the plurality of remote controllers 60 may also be configured using an integrated circuit (IC) capable of performing control similar to the control performed using a CPU and memory. Examples of the IC mentioned herein include a large-scale integrated circuit (LSI), an application-specific integrated circuit (ASIC), a gate array, a field programmable gate array (FPGA), and the like.

An intake temperature sensor 101, a gas-side temperature sensor 102, a liquid-side temperature sensor 103, and a use side heat exchanger temperature sensor 104 are disposed in the heat exchanger unit 10. Note that a thermistor for example can be used as the above temperature sensors or a temperature sensor described later. The intake temperature sensor 101, the gas-side temperature sensor 102, the liquid-side temperature sensor 103, and the use side heat exchanger temperature sensor 104 are connected to the main controller 40, and detection results from the sensors are transmitted to the main controller 40. The intake temperature sensor 101 detects the temperature of air suctioned from the air inflow port 12a. The gas-side temperature sensor 102 detects the temperature of the refrigerant at one of the ports of the use side heat exchanger 11 connected to the in-unit refrigerant pipe 132. The liquid-side temperature sensor 103 detects the temperature of the refrigerant at the other port of the use side heat exchanger 11 connected to the in-unit refrigerant pipe 131. The use side heat exchanger temperature sensor 104 is attached near-midway in the refrigerant flow path inside the use side heat exchanger 11, and detects the heat exchanger temperature in a gas-liquid two-phase state flowing through the use side heat exchanger 11. The main controller 40 uses a detected value from at least one of the intake temperature sensor 101, the gas-side temperature sensor 102, the liquid-side temperature sensor 103, and the use side heat exchanger temperature sensor 104 to determine the instruction related to increasing or decreasing the air supply amount.

A heat source side air temperature sensor 111, a discharge pipe temperature sensor 112, and a heat source side heat exchanger temperature sensor 113 are disposed in the heat source unit 50. The heat source side air temperature sensor 111, the discharge pipe temperature sensor 112, and the heat source side heat exchanger temperature sensor 113 are connected to the heat source controller 56. Detection results from the heat source side air temperature sensor 111, the discharge pipe temperature sensor 112, and the heat source side heat exchanger temperature sensor 113 are transmitted to the main controller 40 through the heat source controller 56. The heat source side air temperature sensor 111 detects the temperature of the air flow before passing through the heat source side heat exchanger 52 produced by the heat source side fan 55. The discharge pipe temperature sensor 112 is configured to detect the temperature of the refrigerant to be discharged from the compressor 51. The heat source side heat exchanger temperature sensor 113 is attached near-midway in the refrigerant flow path inside the heat source side heat exchanger 52, and detects the heat exchanger temperature in a gas-liquid two-phase state flowing through the heat source side heat exchanger 52.

A differential pressure sensor 121 and a blow-out temperature sensor 122 are disposed in the fan unit 30. The differential pressure sensor 121 detects the differential pressure in the air flow between the upstream and downstream sides of the installation location of the fan unit 30, for example. The differential pressure sensor 121 is connected to the fan controller 34 and transmits detected differential pressure data to the fan controller 34. For example, the flow path of the spot where the differential pressure sensor 121 is installed has a predetermined cross-sectional area, and the fan controller 34 can calculate the air supply amount from a value detected by the differential pressure sensor 121. In addition, the fan controller 34 can detect the wind direction from the difference in pressure detected by the differential pressure sensor 121. The blow-out temperature sensor 122 is disposed in the casing 31 of each fan unit 30, for example, and detects the temperature of the conditioned air blown out from each fan unit 30. Here, a case where the blow-out temperature sensor 122 is disposed in the casing 31 of the fan unit 30 is described, but the installation location of the blow-out temperature sensor 122 may also be another location, and may be an installation location inside the outlet unit 70, for example.

Each of the plurality of remote controllers 60 includes a built-in indoor temperature sensor 61, and is configured to input an instruction for turning the operation of the air conditioning system 1 and/or the fan unit 30 on/off, switching between cooling and heating, inputting a set temperature, and inputting a set air flow volume. The set temperature is configured to be inputtable as a numerical value, for example, and the set air flow volume is configured to be inputtable by selecting one from among very low, low, medium, and high ventilation settings. For example, the user uses an input button on the remote controller 60 to select the cooling operation, set the set temperature to 28° C., and select medium ventilation as the set air flow volume.

The main controller 40 calculates the necessary air supply amount to be blown out from each fan unit 30 from the blow-out temperature detected by each blow-out temperature sensor 122 and the set temperature, and controls the rotation speed of the fan motor 33 to bring the detected value from the indoor temperature sensor 61 close to the set temperature. Note that although a case where the indoor temperature sensor 61 is built into the remote controller 60 is described herein, the position where the indoor temperature sensor 61 is provided is not limited to the remote controller 60. For example, an indoor temperature sensor may exist as an independent device, and the main controller 40 may be configured to receive the value of the indoor temperature from the independent indoor temperature sensor.

For example, consider the case where initially three fan units 30 are connected to the heat exchanger unit 10 and one of the air outflow ports 12b of the heat exchanger unit 10 is blocked. In such a case, when adding an additional fan unit 30, a duct 20 is connected to the blocked air outflow port 12b, the additional fan unit 30 is connected to the duct 20, and the outlet unit 70 is connected to the added fan unit 30. If the fan controller 34 of the fan unit 30 added in this way is connected to the main controller 40, a network of the main controller 40 and four fan controllers 34 is formed, and a network that delivers instructions from the main controller 40 can be constructed easily.

(3) Operations by Air Conditioning System 1

In the air conditioning system 1, the set air flow volumes inputted from the plurality of remote controllers 60 act as a basic air supply amount used to determine the air supply amounts of the plurality of fan units 30. However, if the set air flow volume is left unchanged, the set temperature will fall in the cooling operation and rise in the heating operation after the set temperature is achieved. Accordingly, to cause the indoor air temperature to converge on the set temperature, the air supply amount of each fan unit 30 is changed from the set air flow volume by a command from the main controller 40. The main controller 40 calculates an air conditioning load from the temperature difference between the indoor air temperature and the set temperature, and determines the necessary air supply amount from the air conditioning load and the fan temperature of each fan unit 30. For example, in the case where the indoor air temperature matches the set temperature and there is no temperature difference, the air conditioning load is 0, and therefore the main controller 40 stops the fan in each fan unit 30 where the indoor air temperature matches the set temperature, even if the set air flow volume is not 0. However, to avoid the backflow of air from the air outlet 71 toward the heat exchanger unit 10, each fan unit 30 determined to be stopped according to the air conditioning load may be controlled such that the air supply amount is not 0 in order to suppress backflow.

(3-1) Startup

Each fan controller 34 of the fan units 30a to 30d transmits the air supply amount that each of the fan units 30a to 30d is to supply from the set air flow volume of the four remote controllers 60 to the main controller 40. Note that when even a stopped fan unit 30 is operating to send an extremely low amount of air to avoid the backflow of air from the air outlet 71 toward the heat exchanger unit 10, the air conditioning system 1 may be configured to include the slight air supply amount in the total air flow volume. Alternatively, the air conditioning system 1 may be configured not to include the slight air supply amount in the total air flow volume.

The main controller 40 totals the air supply amounts transmitted from all of the fan units 30 to calculate the total air flow volume to be passed through the use side heat exchanger 11. The main controller 40 calculates the temperature of air suctioned into the heat exchanger unit 10 from the intake temperature sensor 101 of the heat exchanger unit 10. Additionally, the main controller 40 requests the heat source controller 56 of the heat source unit 50 for a required refrigerant circulation rate calculated from the total air flow volume and the air temperature of the air to be passed through the use side heat exchanger 11. In response to the request from the main controller 40, the heat source controller 56 of the heat source unit 50 changes the operating frequency of the compressor 51 to change the refrigerant circulation rate.

(3-2) Normal Operation

In the normal operation, the air conditioning system 1 varies the control between the case where the total air flow volume is at or above a lower limit and the case where the total air flow volume is below the lower limit.

(3-2-1) when Total Air Flow Volume is at or Above Lower Limit

When a predetermined length of time has elapsed since startup and a normal operating state is reached, the main controller 40 determines whether or not the total air flow volume is at or above the lower limit. The setting of the lower limit will be described later. If the total air flow volume is at or above the lower limit, the main controller 40 controls the air conditioning system 1 according to the following procedure.

When a predetermined length of time has elapsed since startup and the normal operating state is reached, each fan controller 34 is configured to recalculate the individual air supply amount on a predetermined interval. In the recalculation, each fan controller 34 uses the indoor air temperature detected by the remote controller 60 for example to calculate an air conditioning load on the basis of a status such as the indoor air temperature near each outlet unit 70 "approaching" or "diverging from" the set temperature, and corrects the set air flow volume. Additionally, each fan unit 30 transmits the corrected air supply amount to the main controller 40. Note that the main controller 40 may also be configured to perform the calculations related to correcting the set air flow volume. The main controller 40 recalculates the air supply amounts transmitted from the plurality of fan controllers 34 at each interval to calculate the total air flow volume, and if the total air flow volume is at or above the lower limit, the main controller 40 requests the heat source controller 56 of the heat source unit 50 for the required refrigerant circulation rate calculated from the total air flow volume and the air temperature of the air to be passed through the use side heat exchanger 11 at each interval. In response to the request from the main controller 40, the heat source controller 56 of the heat source unit 50 changes the operating frequency of the compressor 51 to change the refrigerant circulation rate.

(3-2-2) when Total Air Flow Volume is Below Lower Limit

When the total air flow volume is below the lower limit, the main controller 40 calculates the shortage, that is, the difference between the calculated total air flow volume and the lower limit. The main controller 40 assigns the shortage to the plurality of fan units 30 according to a predetermined air flow volume distribution rule. When assigning the shortage to the plurality of fan units 30, because it is sufficient for the total air flow volume to be at or above the lower limit, an air supply amount that matches the shortage is assigned in some cases, and an air supply amount greater than or equal to the shortage is assigned in other cases.

For example, consider the case where the lower limit is 30 $m^3$/min, the fan controller 34 of the fan unit 30a requests 16 $m^3$/min, the fan controller 34 of the fan unit 30b requests 0 $m^3$/min, the fan controller 34 of the fan unit 30c requests 10 m³/min, and the fan controller 34 of the fan unit 30d requests 6 m³/min to the main controller 40. In this case, the total air flow volume calculated by the main controller 40 is 32 m³/min>30 m³/min, and the main controller 40 determines that the total air flow volume is above the lower limit.

Next, if an instruction to stop sending air is inputted from the remote controller 60 into the fan controller 34 of the fan unit 30c, the request from the fan controller 34 of the fan unit 30c is changed from 10 m³/min to 0 m³/min. Consequently, the total air flow volume falls from 32 m³/min to 22 m³/min, and therefore the main controller 40 determines that an instruction that would bring the total air flow volume at or below the lower limit has been issued.

As one example, in the case of determining that a change that would bring the total air flow volume at or below the lower limit has been instructed, the main controller 40 distributes the shortage equally among the operating fan units 30. In the case described above, 8 (=30−22) m³/min is distributed as 4 m³/min to the fan unit 30a and 4 m³/min to the fan unit 30d, so that the fan unit 30a is changed to 20 m³/min and the fan unit 30d is changed to 10 m³/min.

As another example, in the case of determining that a change that would bring the total air flow volume at or below the lower limit has been instructed, the main controller 40 distributes the shortage equally among all of the fan units 30. In the case described above, 8 (=30−22) m³/min is distributed as 2 m³/min each to the fan units 30a to 30d, such that the fan unit 30a is changed to 18 m³/min, the fan unit 30b is changed to 2 m³/min, the fan unit 30c is changed to 2 m³/min, and the fan unit 30d is changed to 8 m³/min.

The main controller 40 determines the lower limit of the total air flow volume of the air conditioning system 1 on the basis of the heat exchanger temperature, for example. For example, if the heat exchanger temperature is high in the cooling operation, the capacity of the heat source unit 50 to supply heating energy is determined to be insufficient, and a high lower limit of the total air flow volume is set. If the heat exchanger temperature is low in the cooling operation compared to such a case, the capacity of the heat source unit 50 to supply heating energy is determined to be more than sufficient, and a lower limit of the total air flow volume that is lower than the above case is set. The specific value of the lower limit is determined by experiment using the actual equipment of the air conditioning system 1 and/or by simulation.

(3-2-4) Detection of Air Backflow

For example, in the distribution flow path including the duct 20a, the fan unit 30a, and the outlet unit 70a, an air flow proceeding from the heat exchanger unit 10 to the air outlet 71 is a normal air flow, but conversely, an air flow proceeding from the air outlet 71 to the heat exchanger unit 10 is an abnormal air flow that acts as air backflow. The same applies to the distribution flow paths including the ducts 20b to 20d, the fan units 30b to 30d, and the outlet units 70b to 70d, and air flows proceeding from the air outlets 71 to the heat exchanger unit 10 act as air backflow. The differential pressure sensor 121 respectively provided in each of the fan units 30a to 30d transmits detection results to the main controller 40 through the fan controllers 34.

The main controller 40 determines that the air flow is normal when the air pressure at the exhaust port 37 is lower than or equal to the air pressure at the intake port 36 of the fan units 30a to 30d, and conversely determines that air backflow is occurring when the air pressure at the exhaust port 37 is higher than the air pressure at the intake port 36 of the fan units 30a to 30d.

(3-2-5) Operation when Air Backflow Occurs

The main controller 40 clears air backflow through the cooperation of the fan units 30. Specifically, the main controller 40 detects a fan unit 30 connected to a distribution flow path where air backflow is occurring. The main controller 40 transmits a command to increase the rotation speed of the fan motor 33 to the fan controller 34 of the fan unit 30 on the distribution flow path where air backflow is occurring. For example, in the case where the fan motor 33 has stopped, a command to start driving at a predetermined rotation speed is transmitted. As another example, in the case where the fan motor 33 is rotating at a low speed, a command to raise the rotation speed of the fan motor 33 further is transmitted.

Note that if the air resistance can be changed with the air deflector 74, the air deflector 74 may also be used to clear the air backflow. For example, in the case where the fan motor 33 has stopped, the air deflector 74 of the outlet unit 70 where air backflow is occurring may be configured to be fully closed. In the case where the fan motor 33 is rotating at a low speed, the main controller 40 may be configured to transmit a command for raising the rotation speed of the fan motor 33 and also increasing the air resistance of the air deflector 74.

Additionally, a configuration may also be adopted in which a backflow prevention damper that is fully closed just by the force of a backflow air current is provided in the distribution flow path. In this case, backflow can be prevented without a command from the main controller 40.

(4) Modifications (4-1) Modification 1A

The first embodiment above describes a case where the ducts 20 are directly connected to the heat exchanger unit 10, but the ducts 20 may also be indirectly connected to the heat exchanger unit 10. For example, a configuration is possible in which an attachment having a plurality of air outlets for connecting the ducts 20 to the heat exchanger unit 10 is installed between the ducts 20 and the heat exchanger unit 10. By preparing multiple types of attachments connectible to different numbers of ducts 20, the number of ducts 20 that can be connected to the same type of heat exchanger unit 10 can be changed.

(4-2) Modification 1B

The first embodiment above describes a case where a single outlet unit 70 is connected to a single fan unit 30, but a configuration in which a plurality of outlet units 70 are connected to a single fan unit 30 is also possible. That is to say, a plurality of air outlets 71 may be provided with respect to a single fan unit 30. In this case, a plurality of remote controllers 60 may also be connected to each fan unit 30, such as by providing one remote controller 60 for each outlet unit 70.

(4-3) Modification 1C

The first embodiment above describes a case where a vent 79 is provided and only a single inlet 81 is provided in the wall between the rooms RA1 and RA2. However, the number of inlets 81 to be provided is not limited to one and may also be a plurality. Also, the inlet 81 may be provided plurally in the same room RA1, or in both of the different rooms RA1 and RA2, for example. In the case of providing the inlet 81 in each of the rooms RA1 and RA2, the vent 79 does not have to be provided.

(4-4) Modification 1D

Another duct 20 and another fan unit 30 may also be connected to the fan unit 30 connected to the other end 22 of a duct 20 whose one end 21 is connected to the heat exchanger unit 10.

For example, a plurality of fan units 30 may be connected in series with respect to a single distribution flow path. As one example of such a connection configuration, two ducts 20, two fan units 30, and one outlet unit 70 may be connected in series from the heat exchanger unit 10 in the order of a duct 20, a fan unit 30, a duct 20, a fan unit 30, and the outlet unit 70. By providing a plurality of power sources in a single distribution flow path, it is possible to set a longer distance from the heat exchanger unit 10 to the air outlet 71 compared to the case of providing just one of the same power source.

(4-5) Modification 1E

The first embodiment above describes a case where a single heat exchanger unit 10 is connected to a single heat source unit 50, but the connection configuration between the heat source unit 50 and the heat exchanger unit 10 is not limited thereto. For example, a plurality of heat exchanger units 10 may also be connected to a single heat source unit 50. Also, a plurality of heat source units 50 may be connected to a plurality of heat exchanger units 10. In these connection configurations, a flow rate adjustment device that adjusts the flow rate of the refrigerant flowing through the use side heat exchanger 11 may also be provided in the heat exchanger units 10. A flow control valve with a variable opening degree may be used as such a flow rate adjustment device.

(4-6) Modification 1F

The first embodiment above describes a case where the compressor 51 of the heat source unit 50 is a type having a variable rotation speed. However, a type of compressor 51 that does not have a variable rotation speed may also be used in the heat source unit 50.

(4-7) Modification 1G

The first embodiment above describes a case where the air conditioning system 1 is configured to be switched between the cooling operation and the heating operation. However, the technical concept of the first embodiment above can be applied to an air conditioning system that is dedicated to cooling only or heating only.

(4-8) Modification 1H

The first embodiment above describes a case where the heat exchanger unit 10 is connected to the heat source unit 50 to form a refrigeration cycle apparatus that runs a refrigerant through the use side heat exchanger 11, but the heat source unit 50 is not limited to the case of connecting the heat exchanger unit 10 to form a refrigeration cycle apparatus. A heat source unit that supplies heating energy to the use side heat exchanger 11 may also be configured to supply a heat medium such as heated water and/or cooled water, for example.

In the case of a configuration that runs a heat medium to the use side heat exchanger 11 in this way, a flow rate adjustment device for adjusting the flow rate of the heat medium flowing to the use side heat exchanger 11 may also be provided in the heat exchanger unit 10.

Also, in the case of connecting the heat exchanger unit 10 to such a heat source unit that supplies a heat medium, a plurality of heat exchanger units 10 may also be connected to a single heat source unit.

(4-9) Modification 1I

The first embodiment above describes a case where, during startup, the main controller 40 requests the refrigerant circulation rate required by the refrigerant circuit 200 as calculated from the calculated total air flow volume of the air passing through the use side heat exchanger 11 and the calculated air temperature of the air suctioned into the heat exchanger unit 10. However, the method by which the main controller 40 determines the required refrigerant circulation rate to be requested is not limited to the method described above. For example, the air conditioning system 1 may also be configured as follows.

During startup, the main controller 40 totals the air supply amounts transmitted from all of the fan units 30, and calculates the total air flow volume passing through the use side heat exchanger 11. The main controller 40 stores an air flow volume table indicating relationships between the total air flow volume and the required refrigerant circulation rate in an internal memory, for example. The main controller 40 selects the air flow volume closest to the calculated total air flow volume from among the air flow volumes described in the air flow volume table. The main controller 40 requests the heat source controller 56 for a refrigerant circulation rate corresponding to the total air flow volume selected from the air flow volume table. Additionally, with regard to the difference between the air flow volume selected from the air flow volume table and the total air flow volume, the air conditioning system 1 may be configured to output a command from the main controller 40 to the fan controllers 34 and thereby cause the plurality of fan units 30 to change the air supply amount in accordance with the difference.

As another example, the air conditioning system 1 may also be configured as follows. During startup, the main controller 40 receives the set temperature from the remote controller 60 through the fan controller 34. Also, the main controller 40 receives the indoor air temperature detected by the remote controller 60, the indoor air temperature calculated from a value detected by the intake temperature sensor 101, or the indoor air temperature from an indoor temperature sensor capable of transmitting the indoor air temperature to the main controller 40. The main controller 40 calculates the overall air conditioning load on the air conditioning system 1 from the received set temperature and indoor air temperature. The main controller 40 calculates the total air flow volume and the required refrigerant circulation rate from the calculated air conditioning load. The main controller 40 calculates the individual air supply amount of each fan unit 30 by multiplying the total air flow volume by the proportion of the air conditioning load on each fan unit 30, and outputs commands to the plurality of fan controllers 34. The air conditioning system 1 may be configured such that each fan controller 34 adjusts itself to match the individual air supply amount indicated by the main controller 40.

(4-10) Modification 1J

In the air conditioning system 1 according to the first embodiment above, a case is described in which the main controller 40 mainly determines the total air flow volume and controls a condition related to the refrigerant in the heat source unit 50 to obey the determined total air flow volume. Conversely, however, the air conditioning system 1 may also be configured to mainly determine a condition related to the refrigerant in the heat source unit 50, and determine the total air flow volume to obey the condition.

For example, the air conditioning system 1 may also be configured such that the heat source controller 56 controls the operating frequency of the compressor 51 and/or the opening degree of the expansion valve 53. In the air conditioning system 1 configured in this way, the heat source controller 56 ascertains information related to the total air flow volume of the air currently passing through the use side heat exchanger 11. From information related to the operating frequency of the compressor 51 and/or the opening degree of the expansion valve 53, the heat source controller 56 transmits an instruction to the main controller 40 indicating a need to increase or decrease the air flow volume with respect to the current total air flow volume. The main controller 40 receives the instruction to increase or decrease the air flow volume from the heat source controller 56, calculates what proportional increase or decrease of the air flow volume in each fan unit 30 is suitable for reducing the energy of the system as a whole, and outputs instructions to the plurality of fan units 30.

(4-11) Modification 1K

The air conditioning system 1 according to the first embodiment above adjusts the refrigerant circulation rate of the refrigerant circuit 200 by changing the operating frequency of the compressor 51. However, the control of the refrigerant circulation rate in the air conditioning system 1 is not limited to controlling the operating frequency of the compressor 51. For example, the adjustment of the refrigerant circulation rate of the refrigerant circuit 200 may be controlled by adjusting the operating frequency of the compressor 51 while also adjusting the opening degree of the expansion valve 53, or the adjustment of the refrigerant circulation rate of the refrigerant circuit 200 may be controlled by adjusting the opening degree of the expansion valve 53.

(4-12) Modification 1

In the first embodiment above, the lower limit of the total air flow volume is determined according to the heat exchanger temperature of the use side heat exchanger 11, but the condensation temperature (TC), the evaporation temperature (TE), or the degree of superheating (SH) and the degree of subcooling (SC) may also be used. The degree of superheating can be calculated by using the inlet temperature and the outlet temperature of the use side heat exchanger 11 or by using the inlet pressure and outlet temperature of the use side heat exchanger 11, for example. The degree of subcooling can be calculated by using the inlet temperature and the outlet temperature of the use side heat exchanger 11 or by using the inlet pressure and outlet temperature of the use side heat exchanger 11, for example.

The lower limit of the total air flow volume may be a predetermined fixed value, and if the lower limit is set to 8 m³/min in advance, the main controller 40 continuously controls the air flow volume to keep from dropping below the lower limit of 8 m³/min, for example.

In addition, the air conditioning system 1 may also be configured such that in the cooling operation, the lower limit of the total air flow volume is determined according to the degree of superheating, the current total air flow volume, and the intake temperature of the air suctioned into the heat exchanger unit 10, for example. The air conditioning system 1 may also be configured such that in the heating operation, the lower limit of the total air flow volume is determined according to the degree of subcooling, the current total air flow volume, and the intake temperature of the air suctioned into the heat exchanger unit 10. The air conditioning system 1 may also be configured such that the lower limit of the total air flow volume is determined according to the refrigerant circulation rate (for example, the operating frequency of the compressor 51), the evaporation temperature (TE), and the intake air temperature and intake air flow volume of the air suctioned into the heat exchanger unit 10. The air conditioning system 1 may also be configured such that the lower limit of the total air flow volume is determined according to an excess or insufficient air flow volume calculated from the dry or wet quality of the refrigerant after passing through the use side heat exchanger 11, and the current air flow volume. Furthermore, the air conditioning system 1 may also be configured such that the lower limit of the total air flow volume is determined according to the refrigerant pressure and refrigerant temperature at the outlet of the use side heat exchanger 11.

(4-13) Modification 1M (4-13-1)

Figure 5:
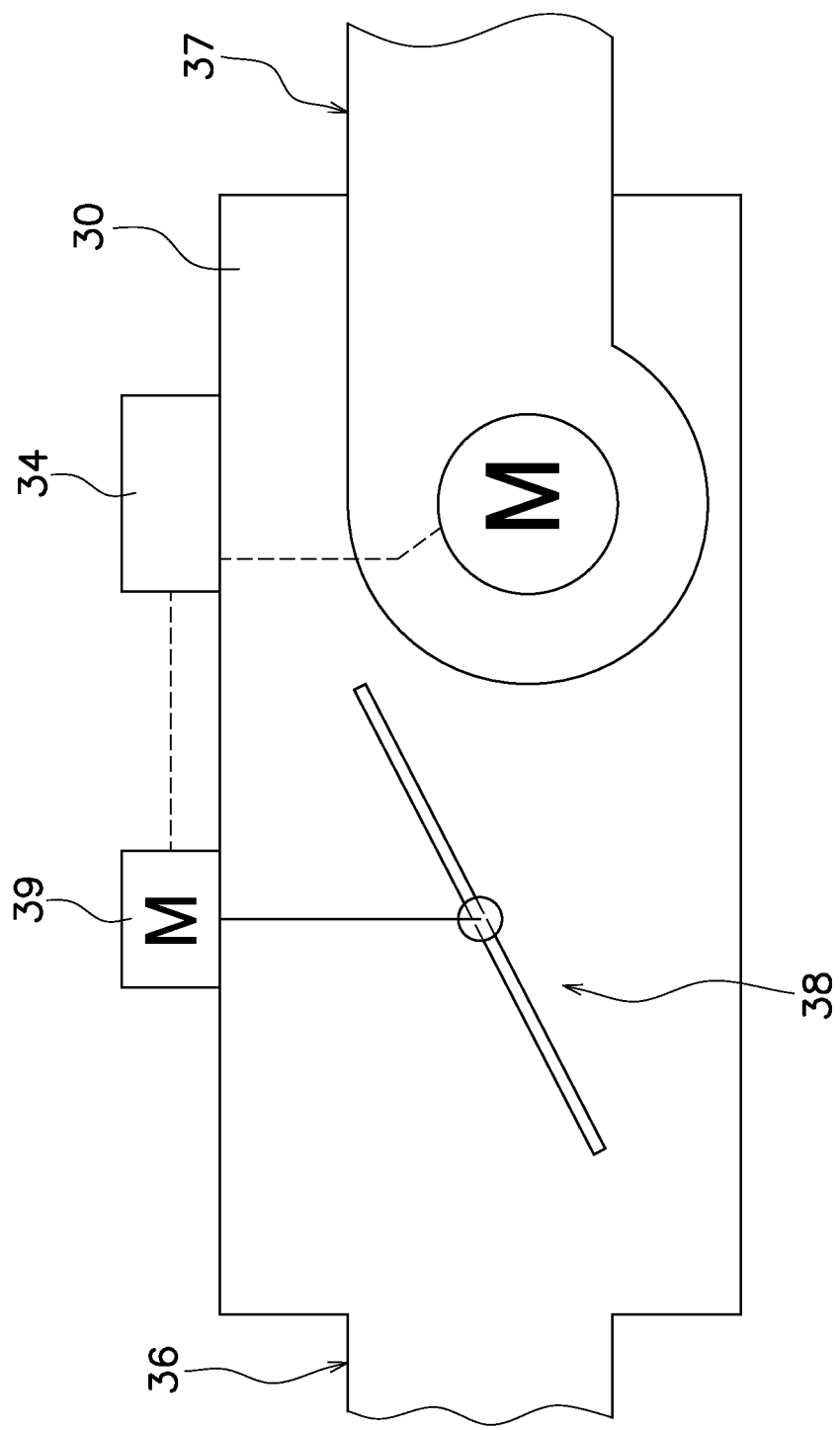
FIG. 5 is a schematic view of another example of the configuration of a fan unit.

The first embodiment is described by taking the fan motors 33 having a variable rotation speed as an example of a plurality of actuators configured to change the individual air supply amounts of the conditioned air suctioned from the heat exchanger unit 10 through the plurality of ducts 20 and supplied to the plurality of air outlets 71 in the air conditioned space SA. However, the actuators are not limited to the fan motors 33, and the driving motor 39 of the damper 38 illustrated in FIG. 5 may also be used as the plurality of actuators, for example. The fan motor 33 of the fan 32 illustrated in FIG. 5 may be a type of motor having a variable rotation speed similar to the first embodiment, or a type of motor that does not have a variable rotation speed. In the case where the fan motor 33 is a type that does not have a variable rotation speed, the air supply amount (air flow volume) from the fan unit 30 to the outlet unit 70 is changed with the damper 38 alone. In contrast, if the fan motor 33 is a type with a variable rotation speed, the air supply amount (air flow volume) from the fan unit 30 to the outlet unit 70 is changed by changing not only the opening degree of the damper 38 but also the rotation speed of the fan motor 33.

Also, a damper unit that includes the damper 38 but does not include a fan may be used as a unit for changing the individual air supply amounts of the conditioned air to be supplied to the air outlets 71. In other words, the air conditioning system 1 may also be configured to include a fan unit that simply causes a fan to rotate at a constant speed and does not have a function of changing the air supply amount, and a damper unit separate from the fan unit, for example. For example, the air conditioning system 1 may be configured such that a damper unit configured to change the air supply amount with the damper 38 is provided partway in at least one of the ducts 20*a* to 20*d*. Additionally, the air conditioning system 1 may also be configured such that the fan unit 30 having a function of changing the air supply amount and a damper unit having a function of changing the air supply amount are disposed together in at least one of the ducts 20*a* to 20*d*.

(4-13-2) Operations when Backflow Occurs

The main controller 40 clears air backflow through the cooperation of the fan units 30. To clear air backflow, first, the main controller 40 detects the fan unit 30 connected to the distribution flow path where the air backflow is occurring. In the case where the fan unit 30 is configured to adjust the air supply amount with the damper 38 alone, the main controller 40 transmits a command for changing the opening degree of the damper 38 to the fan controller 34 of the fan unit 30 in the distribution flow path where the air backflow is occurring. For example, in the case that the fan unit 30 where the air backflow is occurring is not running, a command to fully close the damper 38 is transmitted. Normally air backflow does not occur when sending air according to the opening degree of the damper 38 while causing the fan motor 33 to rotate at a constant speed, and therefore if air backflow occurs in such a case, the main controller 40 uses the remote controller 60 to notify the user of an abnormal state, for example.

In the case where the fan unit 30 is configured to adjust the air supply amount with both the rotation speed of the fan motor 33 and the opening degree of the damper 38, the main controller 40 transmits a command for changing the rotation speed of the fan motor 33 and/or the opening degree of the damper 38 to the fan controller 34 of the fan unit 30 in the distribution flow path where the air backflow is occurring. For example, in the case that the fan unit 30 where the air backflow is occurring is not running, a command to fully close the damper 38 is transmitted. As another example, in the case where the fan motor 33 is rotating at a low speed, a command to raise the rotation speed further is transmitted. Alternatively, in the case where the fan motor 33 is rotating at a low speed, the main controller 40 may be configured to transmit a command for reducing the opening degree of the damper 38 and also raising the rotation speed of the fan motor 33, for example.

(4-14) Modification 1N

The first embodiment above describes a case wherein the differential pressure sensor 121 is used as a detection device that detects air backflow, but the device that detects air backflow is not limited to a device using the differential pressure sensor 121. A directional wind speed sensor may also be used as such a detection device. In the case of using a directional wind speed sensor instead of the differential pressure sensor 121, the wind speed sensor is disposed in the fan unit 30 and connected to the fan controller 34, for example. In the case of using a directional wind speed sensor, the main controller 40 is capable of detecting that air is flowing in the normal direction when the sensor indicates a wind speed in the positive direction, and conversely detecting that air backflow is occurring in the case where the sensor indicates a wind speed in the negative direction. Additionally, the detection device may also be configured using a plurality of nondirectional wind speed sensors. If a plurality of nondirectional wind speed sensors is used to detect a wind speed distribution, and the wind speed distribution is a distribution that occurs when backflow exists, the main controller 40 may determine that backflow is occurring.

(4-15) Modification 1O

In the first embodiment, the description is given of the case where the plurality of fan controllers 34 of the plurality of fan units 30 are directly connected in parallel to the main controller 40 installed in the heat exchanger unit 10. However, the plurality of fan units 30 may be classified into a master unit and a slave unit, and the fan controller 34 may be connected to the main controller 40.

Figure 6:
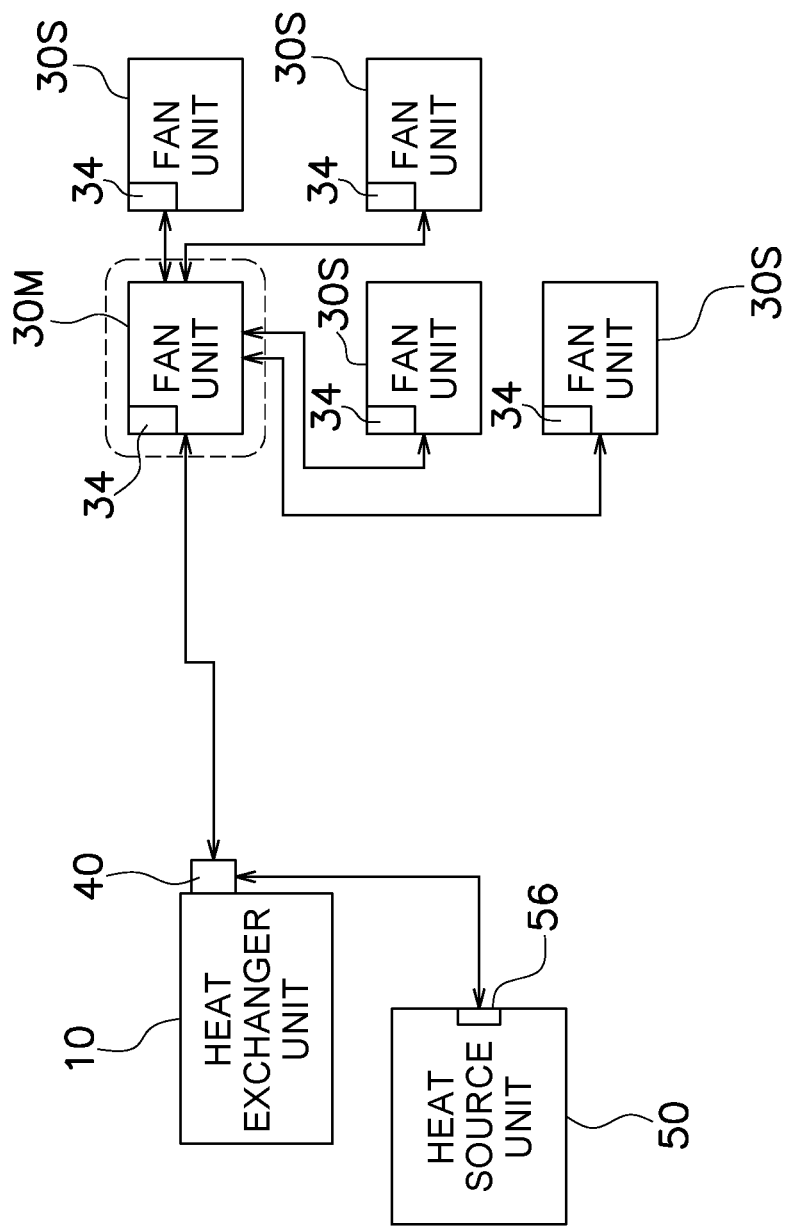
FIG. 6 is a block diagram for explaining the connection relationship between a main controller and a fan controller of a modification 1O.

For example, in a case where five fan units 30M and 30S are connected to one heat exchanger unit 10, as shown in FIG. 6, the five fan units are classified into one fan unit 30M as the master unit and the four fan units 30S as the slave units. The five fan units 30M and 30S have the same configuration as that of the fan unit 30 described above. The main controller 40 of the heat exchanger unit 10 is connected to the heat source controller 56 of the heat source unit 50 and the one fan unit 30M as the master unit. Further, the fan controller 34 of the one fan unit 30M as the master unit is connected to the fan controllers 34 of the four fan units 30S as the slave units. The main controller 40 manages the fan controllers 34 of the four fan units 30S as the slave units through the fan controller 34 of the fan unit 30M as the master unit. The main controller 40 may directly give a command to the fan controllers 34 of the four slave units, or the fan controller 34 of the fan unit 30M as the master unit may give a command in response to the command from the main controller 40.

(4-16) Modification 1P

Figure 7:
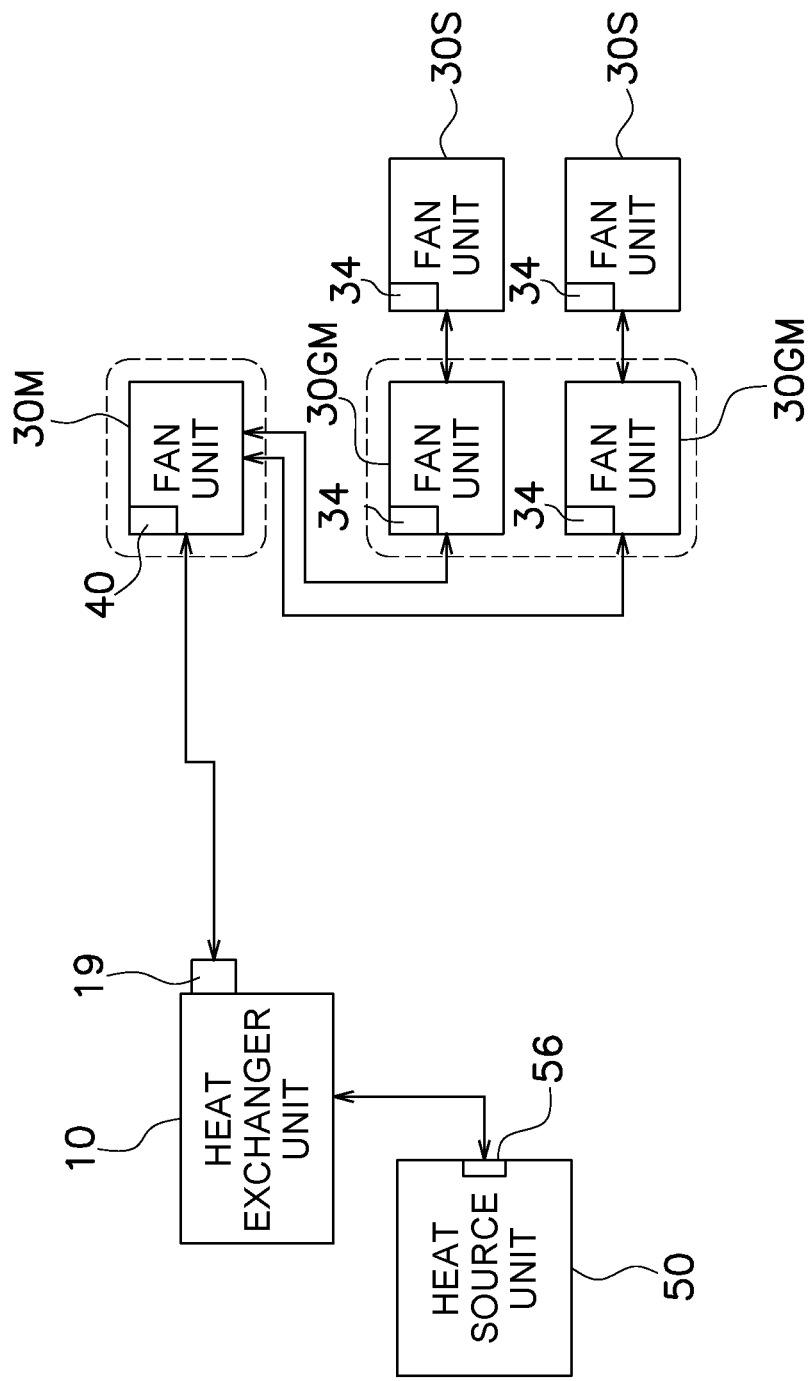
FIG. 7 is a block diagram for explaining an example of the connection relationship between a main controller and a fan controller of a modification 1P.
Figure 8:
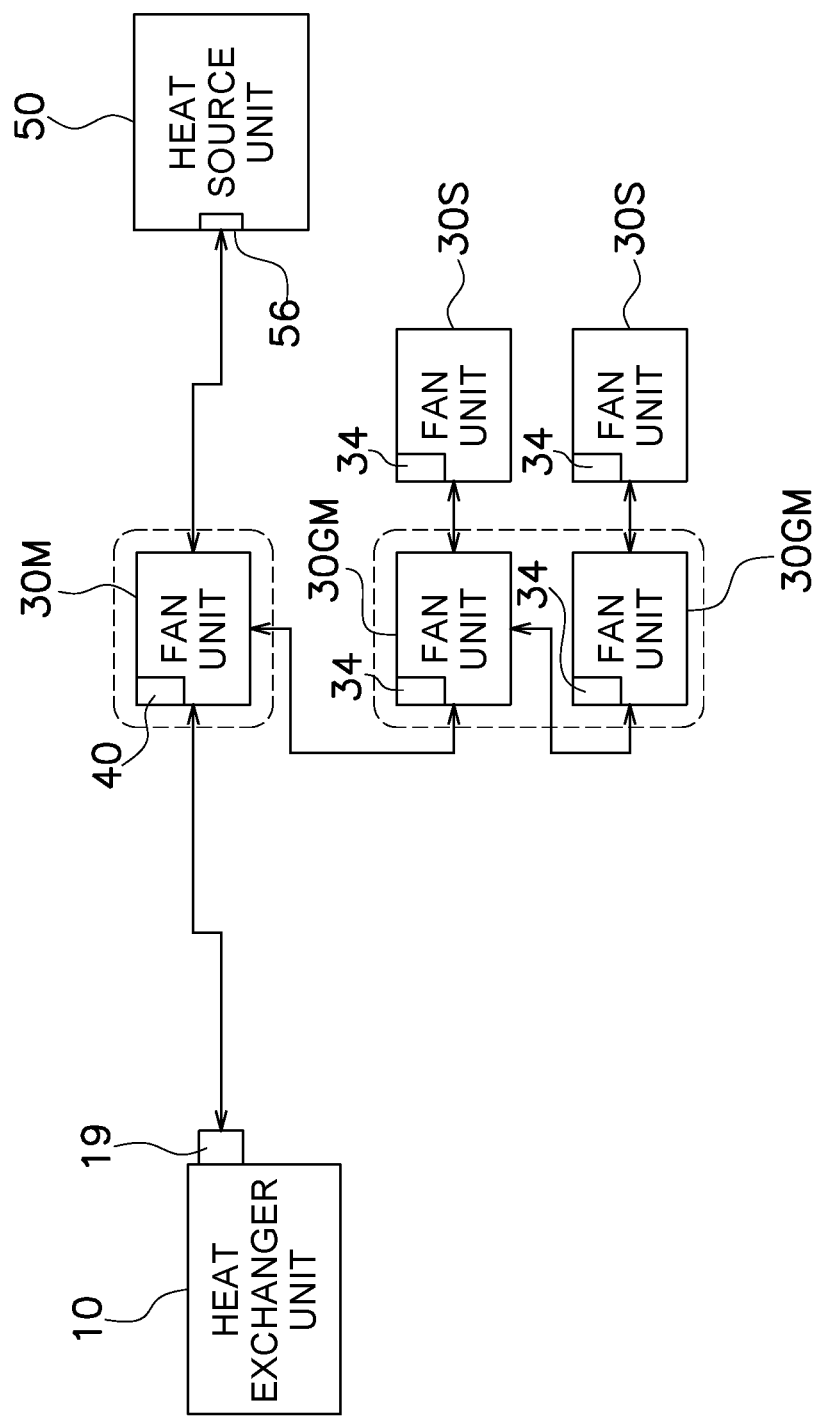
FIG. 8 is a block diagram for explaining another example of the connection relationship between a main controller and a fan controller of a modification 1P.

In the first embodiment and the modification 1O, the main controller 40 is installed in the heat exchanger unit 10, however, the main controller 40 may be installed in the fan unit 30M as the master unit as shown in FIG. 7 or 8.

In such a case, the heat exchanger unit 10 is provided with a terminal 19 for connection to various sensors disposed therein. The main controller 40 is connected to a sensor inside the heat exchanger unit 10 through the terminal 19 of the heat exchanger unit 10. As shown in FIG. 7, the heat source controller 56 of the heat source unit 50 is connected to the main controller 40 of the fan unit 30M through the heat exchanger unit 10. Alternatively, as shown in FIG. 8, the heat source controller 56 of the heat source unit 50 is directly connected to the main controller 40 of the fan unit 30M.

For example, in a case where the five fan units 30M, 30GM, and 30S are connected to one heat exchanger unit 10, as shown in FIG. 7 or 8, the five fan units are classified into the one fan unit 30M as the master unit, the two fan units 30GM as group master units, and the two fan units 30S as the slave units. Here, the fan controller 34 of the fan unit 30M as the master unit is only replaced with the main controller 40, and the configurations of the five fan units 30M, 30GM, and 30S are the same as that of the fan unit 30 described above. The main controller 40 of the fan unit 30M is connected to the fan units 30GM as the group master units. Next, the fan controller 34 of the fan unit 30GM as each of the group master units is connected to the fan controller 34 of the fan unit 30S as the slave unit of each group. The description herein takes the case where the fan controller 34 of one fan unit 30S as the slave unit is connected to the fan controller 34 of one fan unit 30GM as the group master unit; however, the number of fan controllers 34 of the slave units connected to the fan controller 34 of the group master unit is not limited to one, and may be two or more. Further, the number of group master units is not limited to two, and may be one or three or more. Another configuration is possible in which a plurality of fan controllers 34 of the fan units 30S as the slave units are connected in parallel to the main controller 40 of one fan unit 30M.

The main controller 40 manages the fan controllers 34 of the two fan units 30GM as the group master units. In addition, the main controller 40 manages the fan controllers 34 of the two fan units 30S as the group slave units through the fan controllers 34 of the fan units 30GM as the group master units. The main controller 40 may directly give a command to the fan controllers 34 of the two slave units, or the fan controller 34 of the group master unit may give a command in response to the command from the main controller 40.

(4-17) Modification 1Q

In the first embodiment and the modifications 1O to 1P described above, the main controller 40 is installed in the heat exchanger unit 10; however, as shown in FIG. 9, 10, 11, or 12, the main controller 40 may be installed in a place other than the heat exchanger unit 10, the fan unit 30, and the heat source unit 50.

In such a case, the heat exchanger unit 10 is provided with a terminal 19 for connection to various sensors disposed therein. The main controller 40 is connected to a sensor inside the heat exchanger unit 10 through the terminal 19 of the heat exchanger unit 10.

Figure 9:
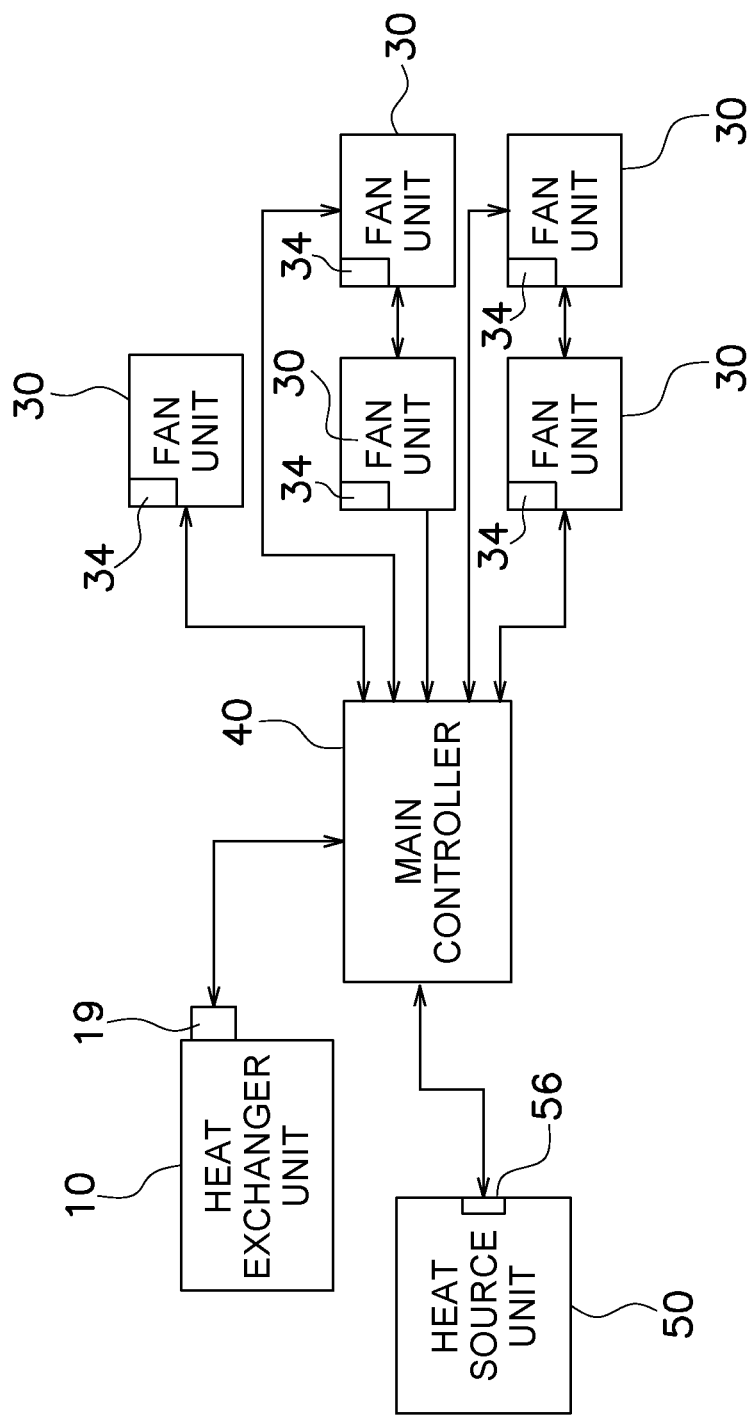
FIG. 9 is a block diagram for explaining an example of the connection relationship between a main controller and a fan controller of a modification 1Q.

FIG. 9 is a block diagram showing a configuration in which the main controller 40, the fan controller 34, and the heat source controller 56 are connected in a manner similar to those in the first embodiment, and the installation position of the main controller 40 is changed from the heat exchanger unit 10 in the first embodiment to another place.

Figure 10:
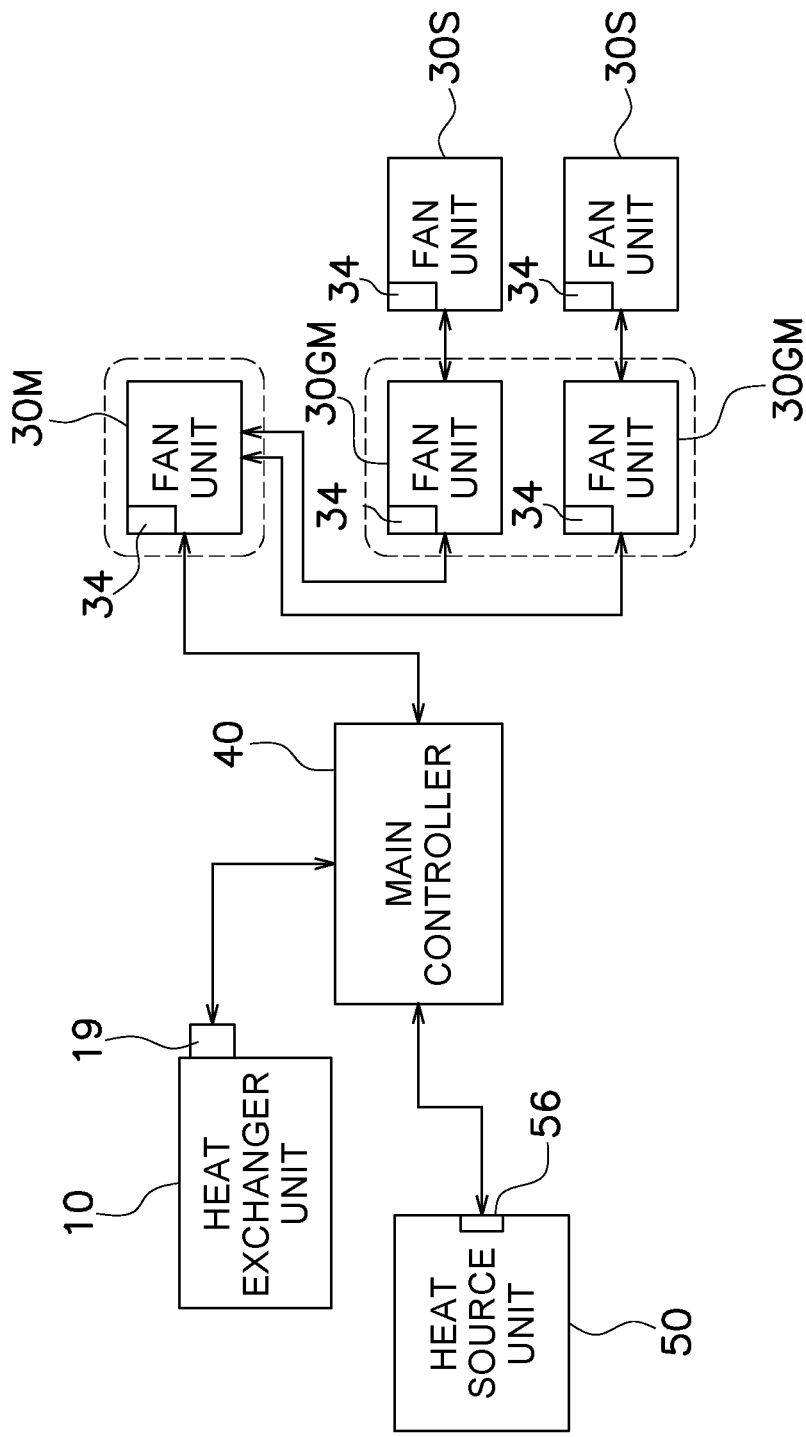
FIG. 10 is a block diagram for explaining another example of the connection relationship between a main controller and a fan controller of a modification 1Q.

FIG. 10 is a block diagram showing a configuration in which the main controller 40, the fan controller 34, and the heat source controller 56 are connected in a manner similar to those in the modification 1O shown in FIG. 7, and the installation position of the main controller 40 is changed from the heat exchanger unit 10 in the modification 1O to another place.

(4-18) Modification 1R

Figure 11:
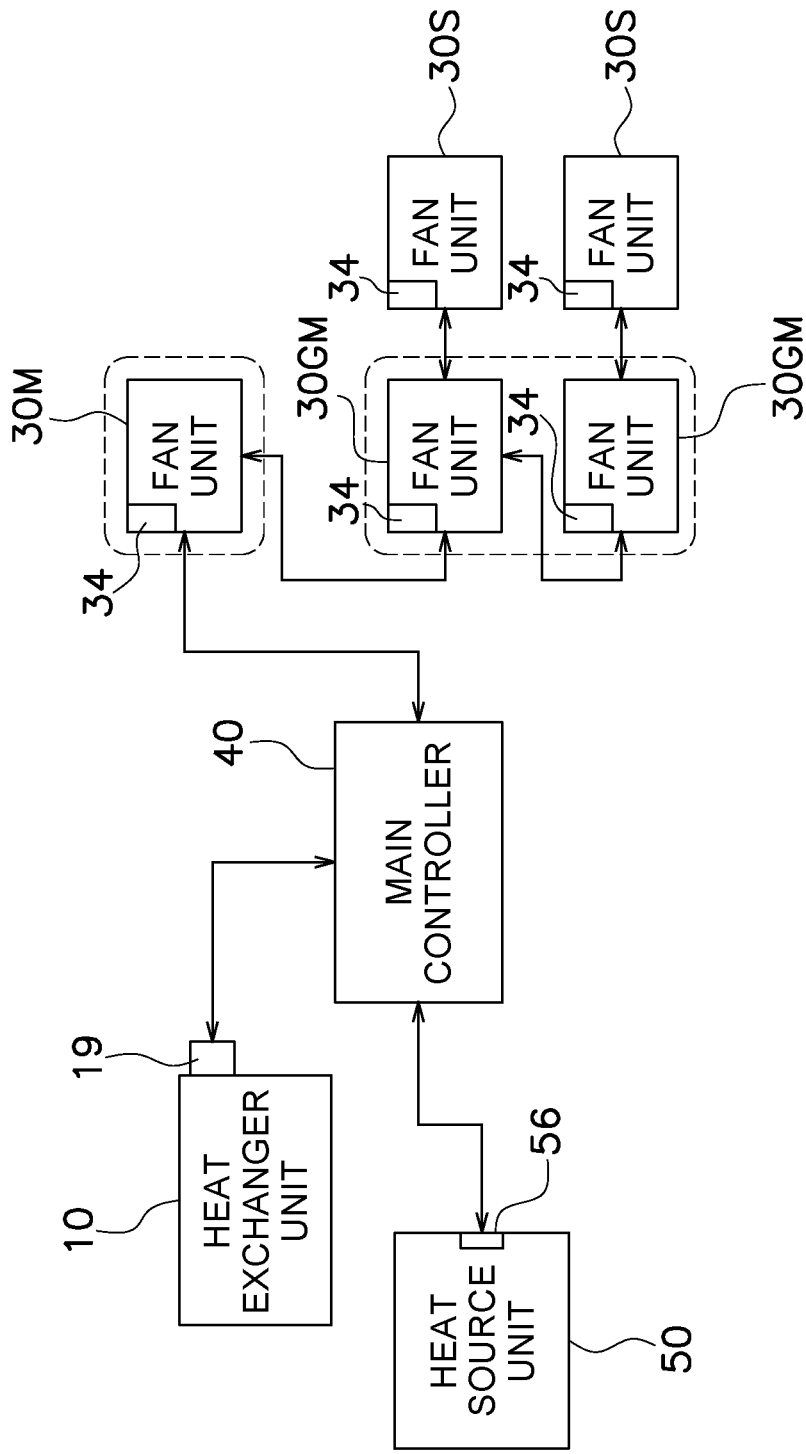
FIG. 11 is a block diagram for explaining still other example of the connection relationship between a main controller and a fan controller of a modification 1Q.

In the modification 1Q, the description takes the case where the plurality of fan controllers 34 of the plurality of fan units 30 are directly connected in parallel to the main controller 40 (see FIG. 9) and the case where the fan controllers 34 of the two fan units 30GM as the group master units are connected to the fan controller 34 of the one fan unit 30M as the master unit and the fan controller 34 of the fan unit 30S as the slave unit is connected to the group master unit (see FIGS. 10 and 11). However, instead of providing the entire master unit, the master units may be classified into group master units and the fan controller 34 may be connected to the main controller 40.

Figure 12:
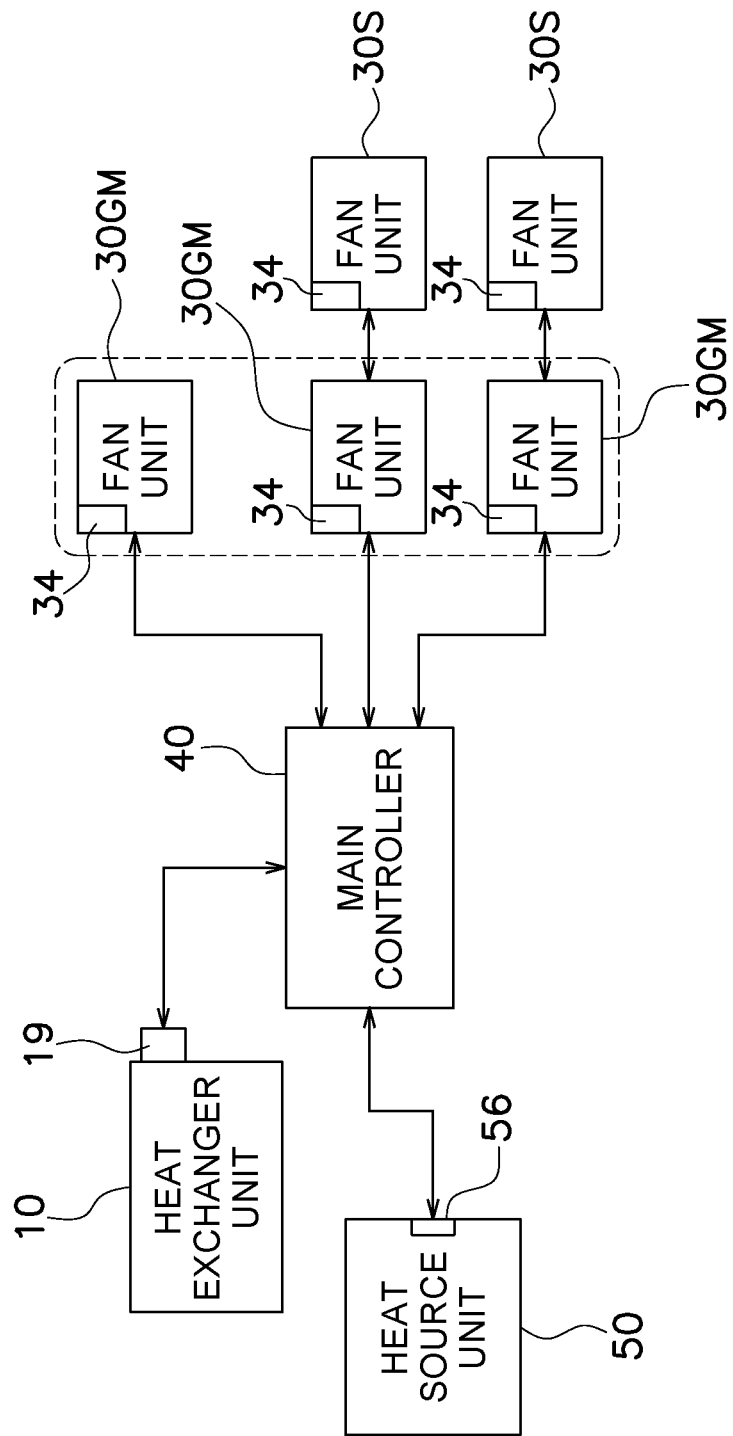
FIG. 12 is a block diagram for explaining another example of the connection relationship between a main controller and a fan controller of a modification 1R.

For example, in a case where the five fan units 30GM and 30S are connected to one heat exchanger unit 10, as shown in FIG. 12, the five fan units are classified into the three fan units 30GM as the group master units and the two fan units 30S as the slave units. The five fan units 30GM and 30S have the same configuration as that of the fan unit 30 described above. The main controller 40 of the heat exchanger unit 10 is connected to the heat source controller 56 of the heat source unit 50 and the three fan units 30GM as the group master units. Next, the fan controllers 34 of the two fan units 30GM as the group master units are connected to the fan controller 34 of the fan unit 30S as the slave unit of each group. However, the fan controller 34 as the slave unit is not connected to the fan controller 34 of the one fan unit 30GM as the group master unit. The description herein takes the case where the fan controller 34 of one fan unit 30S as the slave unit is connected to the fan controller 34 of one fan unit 30GM as the group master unit and the case where the fan controller 34 of the slave unit is connected to the fan controller 34 of the one fan unit 30GM as the group master unit; however, the number of fan controllers 34 of the slave units connected to the fan controller 34 of the group master unit is not limited to one, and may be two or more.

The main controller 40 manages the fan controllers 34 of the two fan units 30S as the group slave units through the fan controllers 34 of the two fan units 30GM as the group master units. The main controller 40 may directly give a command to the fan controllers 34 of the two slave units, or the fan controller 34 of the group master unit may give a command in response to the command from the main controller 40.

As described above, since the main controller 40 is disposed in a place other than the heat exchanger unit 10 and the plurality of fan units 30, the installation of the main controller 40 is no longer limited to the heat exchanger unit 10 and the plurality of fan units 30GM and 30S, which increases the flexibility of the installation of the main controller 40 and makes it easy to handle the main controller 40.

(4-19) Modification 1S

The first embodiment above describes a configuration in which the differential pressure sensor 121 (air flow volume detector) is used to detect the differential pressure inside a predetermined segment, but the configuration that detects the air flow volume is not limited to such a configuration. For example, the configuration that detects the air flow volume may also be configured to use a differential pressure sensor to detect the differential pressure before and after the fan 32 of each fan unit 30, and the main controller 40 or the fan controller 34 may calculate the air flow volume from the differential pressure characteristics before and after the fan 32. In this case, the differential pressure sensor also acts as the air flow volume detector. For example, a wind speed sensor may be used to detect the wind speed at a specific position, and the main controller 40 or the fan controller 34 may be configured to calculate the air flow volume from the wind speed characteristics at the specific position. In this case, the wind speed sensor acts as the air flow volume detector. For example, a pressure sensor may be used to detect an internal pressure displacement, and the main controller 40 or the fan controller 34 may be configured to calculate the air flow volume by comparing the internal pressure displacement when a prescribed air flow volume flows to the detected pressure displacement. In this case, the pressure sensor acts as the air flow volume detector. As another example, the main controller 40 or the fan controller 34 may be configured to use the operating current of the fan 32 to calculate the air flow volume from the workload of the fan motor 33. In this case, a device that detects the operating current acts as the air flow volume detector.

(4-20) Modification 1T

The first embodiment above describes an example of a case where the main controller 40 calculates the refrigerant circulation rate and transmits a request to change the operating frequency of the compressor 51 to the heat source controller 56, and the heat source controller 56 controls the operating frequency of the compressor 51. However, the air conditioning system 1 may also be configured such that the main controller 40 controls the operating frequency of the compressor 51 and/or the opening degree of the expansion valve 53.

(4-21) Modification 1U

The first embodiment above describes a case where the plurality of ducts 20*a* to 20*d* are connected to the heat exchanger unit 10, and the ducts 20*a* to 20*d* respectively extend from the heat exchanger unit 10 to the fan units 30 without branching partway along. However, ducts that branch partway along may also be used in the air conditioning system 1. For example, the air conditioning system 1 may also be configured such that a fan unit 30 is connected to each branch diverging from a single duct.

(5) Characteristics 5-1

The air conditioning system 1 of the first embodiment includes the controller 300, the plurality of ducts 20, 20*a* to 20*e*, and the plurality of fan units 30, 30*a* to 30*d*, 30M, 30GM, and 30S. The plurality of ducts 20, 20*a* to 20*e* are used to distribute conditioned air that has passed through the use side heat exchanger 11 of the heat exchanger unit 10. The plurality of fan units 30, 30*a* to 30*d*, 30M, 30GM, and 30S are provided so as to correspond to the plurality of ducts 20, 20*a* to 20*e*, and supply the conditioned air from the heat exchanger unit 10 through the plurality of ducts 20, 20*a* to 20*e* to the air conditioned space SA. The plurality of actuators are configured to change the air supply amount of conditioned air to be supplied to the air conditioned space SA. In the first embodiment, the plurality of actuators are selected from among the plurality of fan motors 33, the plurality of driving motors 39, and the plurality of air deflector motors 75. The plurality of actuators are the plurality of fan motors 33, the plurality of driving motors 39, or the plurality of air deflector motors 75 in some cases. In addition, the plurality of actuators may include different types of actuators, for example, both the fan motor 33 and the driving motor 39 at the same time. Each of the plurality of ducts 20, 20a to 20e is disposed in one of the plurality of distribution flow paths. Each of the plurality of fan units 30, 30a to 30d, 30M, 30GM, and 30S includes the fans 32, 32a to 32d, which are first fans, and is arranged in one of the plurality of distribution flow paths. Each of the plurality of actuators is disposed in one of the plurality of distribution flow paths. By controlling the plurality of actuators, the controller 300 controls the air supply amount of each of the plurality of fan units 30, 30a to 30d, 30M, 30GM, and 30S. As a result, the air conditioning system 1 according to the first embodiment can adjust the air flow volume passing through the use side heat exchanger 11 such that heat is exchanged efficiently in the use side heat exchanger 11, and energy consumption can be moderated.

(5-2)

The main controller 40 of the controller 300 of the first embodiment gives a plurality of instructions concerning the air supply amounts of the plurality of fan units 30 in order to control the number of rotations of the plurality of fan motors 33 which are a plurality of actuators in the plurality of fan units 30, the driving motors 39 of the plurality of dampers 38, or the air deflector motor 75 of the air deflector 74. As a result, the air conditioning system 1 according to the first embodiment can adjust the air flow volume passing through the use side heat exchanger 11 such that heat is exchanged efficiently in the use side heat exchanger 11, and energy consumption can be moderated.

5-3

In the air conditioning system 1 according to the first embodiment, since the main controller 40 is disposed in the heat exchanger unit 10, it is preferable to construct a network connecting the main controller 40 and the fan motors 33, which are a plurality of actuators, in accordance with the flow of the conditioned air supplied from the heat exchanger unit 10. Therefore, a network for sending an instruction from the main controller 40 can be easily constructed with the heat exchanger unit 10 as a starting point.

5-4

In a case where the main controller 40 is disposed in the fan unit 30M as the master unit which is one of the plurality of fan units 30, the air conditioning system 1 including one main controller 40 in the plurality of fan units 30 can be formed by connecting the network of the plurality of fan units 30, which facilitates the construction of the air conditioning system 1. In other words, since it is only required that at least one fan unit 30M as the master unit is included in the plurality of fan units 30, the air conditioning system 1 can be easily designed and constructed.

Note that, in a case where a plurality of main controllers 40 are present, the plurality of main controllers 40 may be configured to cooperate and act as one main controller. For example, in a case where an extension is made, the newly added main controller 40 and the main controller 40 existing before the extension can be configured to communicate with each other to function as one new main controller.

5-5

In a case where the main controller 40 is disposed in a place other than the heat exchanger unit 10 and the plurality of fan units 30, the installation of the main controller 40 is no longer limited to the heat exchanger unit 10 and the plurality of fan units 30M, 30GM and 30S, which increases the flexibility of the installation of the main controller 40 and makes it easy to handle the main controller 40.

5-6

The air conditioning system 1 of the first embodiment is so configured that the airflow passing through the use side heat exchanger 11 is generated only by the air suction force of the plurality of fan units 30. Therefore, a power source for generating air flow in the heat exchanger unit 10 does not have to be provided, and it is possible to reduce the cost comparing to the case where a power source for generating air flow is provided in the heat exchanger unit 10. In addition, the heat exchanger unit 10 can be easily made thinner, and the range in which the air conditioning system 1 is installed can be expanded.

5-7

In a case where the heat exchanger unit 10 includes at least one of the gas-side temperature sensor 102, the liquid-side temperature sensor 103, and the use side heat exchanger temperature sensor 104 that are heat medium temperature sensors for detecting the temperature of the refrigerant that is a heat medium flowing through the use side heat exchanger 11 or the pipe connected to the use side heat exchanger 11, and the intake temperature sensor 101 for detecting the temperature of the air sucked into the heat exchanger unit, and where the main controller 40 uses a detected value of at least one of the heat medium temperature sensor and the suction temperature sensor to determine an instruction concerning the increase or decrease in the air supply amount, the main controller 40 easily gives an instruction to the plurality of fan units 30 to supply air to meet the operating conditions of the heat exchanger unit 10. For example, in a case where the heat energy supplied from the heat source unit 50 to the heat exchanger unit 10 is insufficient, the main controller 40 reduces the air supply amount on the basis of the detected value of the use side heat exchanger temperature sensor 104, which reduces a problem such as excessive dropping of the temperature of the refrigerant supplied from the heat source unit 50.

5-8

The remote controller 60 of the air conditioning system 1 of the first embodiment has a set temperature function to set temperatures of the rooms RA1 and RA2 that are the air conditioned spaces SA and an indoor temperature detection function. The main controller 40 uses the set temperature of the remote controller 60 and the room temperature detected by the remote controller 60 to determine an instruction concerning the increase or decrease in the air supply amount. As a result, the main controller 40 can give an instruction to bring the temperature of the air conditioned space SA closer to the set temperature. In the first embodiment, the remote controller 60 is installed at a plurality of locations in the room RA1 that is the air conditioned space SA, which makes it easy to bring the indoor air temperature at each of the plurality of locations closer to the set temperature.

5-9

The air conditioning system 1 of the first embodiment includes the compressor 51 for compressing the refrigerant to be circulated in the use side heat exchanger 11, the heat source side heat exchanger 52 for transferring heat of the refrigerant circulated in the use side heat exchanger 11, and the expansion valve 53 for expanding the refrigerant passing between the use side heat exchanger 11 and the heat source heat exchanger 52. The main controller 40 is connected, through the heat source controller 56, to the compressor 51 and/or the expansion valve 53 to control the system operation. As a result, it is possible to appropriately control the system operation by controlling the number of rotations of the compressor 51 and/or the opening degree of the expansion valve 53 so as to achieve, for example, a refrigerant circulation rate derived by calculation together with the increase or decrease in the air supply amount, and it is possible to control the increase or decrease in the air supply amount while causing the refrigerant circulating through the use side heat exchanger 11 and the heat source side heat exchanger 52 to perform an appropriate refrigeration cycle.

5-10

In the air conditioning system 1 of the first embodiment, since the main controller 40 is connected to the compressor 51 and/or the expansion valve 53 for control over the system operation, the main controller 40 can appropriately control the system operation by controlling the number of rotations of the compressor 51 and/or the opening degree of the expansion valve 53 so as to, for example, achieve the refrigerant circulation rate derived by calculation with the increase or decrease in the air supply amount. The main controller 40 can control the increase or decrease in the air supply amount while causing the refrigerant circulating through the use side heat exchanger 11 and the heat source side heat exchanger 52 to perform an appropriate refrigeration cycle.

5-11

In the air conditioning system 1 of the first embodiment, the main controller 40 controls the fan motor 33 that is an actuator or the damper 38 on the basis of information indicating the number of rotations of the compressor 51 and/or the opening degree of the expansion valve 53 for control over the system operation, therefore, it is possible to control the increase or decrease in the air supply amount while causing the refrigerant circulating through the use side heat exchanger and the heat source side heat exchanger to perform an appropriate refrigeration cycle.

5-12

The main controller 40 controls air flow volume of air passing through the use side heat exchanger 11 with the plurality of fan motors 33 while adjusting the fan motor 33 that is a plurality of actuators in order to prevent backflow, in the plurality of ducts 20, of the conditioned air flowing from the heat exchanger unit 10 toward the plurality of air outlets 71. As a result, it is possible to prevent reduction in heat exchange efficiency due to the backflow of the conditioned air in the plurality of ducts. Further, together with the control described above, the main controller 40 controls the circulation amount of the refrigerant by the number of rotations of the compressor 51 and/or the opening degree of the expansion valve 53, which makes it easy to moderate the decrease in the heat exchange efficiency.

5-13

The air conditioning system 1 of the first embodiment includes each damper 38 of each fan unit 30 attached to each duct 20, and the driving motor 39 (an example of the actuator) for driving each damper 38. The main controller 40 controls to adjust the opening degrees of the plurality of dampers 38 in order to prevent backflow, in the plurality of ducts 20, of the conditioned air flowing from the heat exchanger unit 10 toward the plurality of air outlets 71. As a result, it is possible to easily prevent reduction in heat exchange efficiency due to the backflow of the conditioned air in the plurality of ducts 20.

Alternatively, the air conditioning system 1 includes each air deflector 74 of each outlet unit 70 attached to each duct 20, and the air deflector motor 75 for driving each air deflector 74. The main controller 40 controls to adjust the opening degrees of the plurality of air deflectors 74 to prevent backflow, in the plurality of ducts 20, of the conditioned air flowing from the heat exchanger unit 10 toward the plurality of air outlets 71. As a result, it is possible to easily prevent reduction in heat exchange efficiency due to the backflow of the conditioned air in the plurality of ducts 20.

5-14

The air conditioning system 1 of the first embodiment includes a plurality of fan motors 33 configured to change the air supply amount of each of the plurality of fan units 30. The air conditioning system 1 controls the backflow of the conditioned air in each duct 20 by adjusting the number of rotations of each fan motor 33, which makes it easy to prevent reduction in heat exchange efficiency due to the backflow of the conditioned air in each duct 20.

Second Embodiment (6) Overall Configuration

The main controller 40 controls a plurality of actuators in accordance with a plurality of instructions concerning the air supply amounts of the plurality of fan units 30, and such type of control form is not limited to the form of the first embodiment. The air conditioning system 1 in which the main controller 40 controls a plurality of actuators with a plurality of instructions related to the air supply amounts of the plurality of fan units 30 may also be configured like the second embodiment. In the air conditioning system 1 of the second embodiment, the plurality of fan controllers 34, which are a plurality of sub controllers, receive a plurality of instructions sent by the main controller 40. In the air conditioning system 1 of the second embodiment, each of the plurality of fan controllers 34 controls at least one of the plurality of actuators on the basis of at least one of the plurality of instructions.

Specifically, the air conditioning system 1 according to the second embodiment is described by taking the example of the case of including the configuration illustrated in FIG. 1, similarly to the air conditioning system 1 according to the first embodiment. The second embodiment describes the case where the air conditioning system 1 illustrated in FIG. 1 changes the air supply amount with the fan motor 33, but the damper 38 and the air deflector 74 are not involved in changing the air supply amount.

Like the main controller 40 according to the first embodiment, the main controller 40 according to the second embodiment calculates the necessary air supply amount to be blown out from each fan unit 30 from the blow-out temperature detected by each blow-out temperature sensor 122 and the set temperature. Specifically, for example, the main controller 40 calculates the air supply amount of each of the fan units 30*a* to 30*d* from the temperature difference between the indoor air temperature and the set temperature, and also the fan temperature. The main controller 40 sets the calculated air supply amount (target air supply amount) for each of the fan units 30*a* to 30*d* as an instruction to issue to each of the fan units 30*a* to 30*d*.

The main controller 40 transmits the plurality of calculated air supply amounts to the plurality of fan controllers 34 as target air supply amounts. In other words, the main controller 40 transmits a plurality of instructions to the plurality of fan controllers 34 that control the fan units 30*a* to 30*d*. The main controller 40 transmits the target air supply amount for the fan unit 30*a* to the fan controller 34 installed in the fan unit 30*a*, for example. The target air supply amount for the fan unit 30*a* is an instruction related to the air supply amount of the fan unit 30. The fan controller 34 of the fan unit 30a controls the rotation speed of the fan motor 33a to cause the air supply amount to approach the target air supply amount. Similarly, the main controller 40 transmits the target air supply amount for the fan units 30b to 30d to the fan controller 34 installed in the fan units 30b to 30d, for example. The fan controller 34 of the fan units 30b to 30d controls the fan motors 33b to 33d to cause the air supply amount to approach the target air supply amount.

Described in further detail, each of the fan units 30a to 30d includes the differential pressure sensor 121 as an air flow volume detector that detects the air flow volume passing through each unit. Note that the air flow volume detector is not limited to the differential pressure sensor 121. For example, the air flow volume detector may also be a wind speed sensor. For example, the fan controller 34 of the fan unit 30a compares the volume of air (air supply amount) passing through the fan unit 30a detected by the differential pressure sensor 121 of the fan unit 30a with a target air flow volume (target air supply amount). If the air flow volume passing through the fan unit 30a is less than the target air flow volume, the fan controller 34 of the fan unit 30a increases the rotation speed of the fan motor 33a to increase the air flow volume (air supply amount) of the fan unit 30a and approach the target air flow volume. Conversely, if the air flow volume passing through the fan unit 30a is greater than the target air flow volume, the fan controller 34 of the fan unit 30a decreases the rotation speed of the fan motor 33a to decrease the air flow volume (air supply amount) of the fan unit 30a and approach the target air flow volume.

Here, the case where the fan controller 34 is installed in the fan unit 30 is described. However, the fan controller 34 does not have to be installed in the fan unit 30.

(7) Modifications (7-1) Modification 2A

In the second embodiment described above, the description is given of the case where the fan motor 33 functions as an actuator for changing the air supply amount. However, the actuator for changing the air supply amount in the second embodiment is not limited to the fan motor 33. For example, the plurality of actuators may be the driving motor 39 of the damper 38 shown in FIG. 5. The fan motor 33 of the fan 32 illustrated in FIG. 5 may be a type of motor having a variable rotation speed similar to the second embodiment, or a type of motor that does not have a variable rotation speed. In the case where the fan motor 33 is a type that does not have a variable rotation speed, for example, the air supply amount (air flow volume) from the fan unit 30 to the outlet unit 70 is changed with the damper 38 alone. In contrast, if the fan motor 33 is a type with a variable rotation speed, the air supply amount (air flow volume) from the fan unit 30 to the outlet unit 70 is changed by changing not only the opening degree of the damper 38 but also the rotation speed of the fan motor 33. In such a case, the fan controller 34 may be so configured to control both the driving motor 39 and the fan motor 33 as the actuators.

In a case where the fan motor 33 is the motor of a type incapable of changing the number of rotations and the air supply amount (air flow volume) from the fan unit 30 to the outlet unit 70 is changed only by the damper 38, a damper controller is provided instead of the fan controller 34. The main controller 40 sends the calculated air supply amount to the plurality of damper controllers as the target air supply amount. The main controller 40 sends, for example, the target air supply amount of the fan units 30a to 30d to the damper controller attached to the fan units 30a to 30d. The target air supply amount of the fan units 30a to 30d is an instruction concerning the air supply amount of the fan unit 30. In other words, the main controller 40 sends a plurality of instructions to the plurality of damper controllers for controlling the fan units 30a to 30d. The damper controller of the fan units 30a to 30d controls the opening degree of the damper 38 to bring the air supply amount closer to the target air supply amount.

More specifically, for example, the damper controller of each of the fan units 30a to 30d compares volume of air (air supply amount) passing through the fan unit 30a detected by the differential pressure sensor 121 of each of the fan units 30a to 30d with the target air flow volume (target air supply amount). In a case where the volume of the air passing through the fan units 30a to 30d is smaller than the target air flow volume, the damper controller of each of the fan units 30a to 30d increases the opening degree of the damper 38 with the driving motor 39 and increases the air flow volume (air supply amount) of the fan units 30a to 30d to bring the air flow volume closer to the target air flow volume. Conversely, in a case where the volume of the air passing through the fan units 30a to 30d is greater than the target air flow volume, the opening degree of the damper 38 is reduced by the driving motor 39 and reduces the air flow volume (air supply amount) of the fan units 30a to 30d to bring the air flow volume closer to the target air flow volume.

For example, the plurality of actuators may be the air deflector motor 75. The fan motor 33 of the fan 32 may be a motor of a type capable of changing the number of rotations similar to that of the second embodiment, or may be a motor of a type incapable of changing the number of rotations. In a case where the fan motor 33 is the motor of a type incapable of changing the number of rotations, the air supply amount (air flow volume) from the fan unit 30 to the outlet unit 70 is changed by both or any one of the damper 38 and the air deflector 74, for example. On the other hand, in a case where the fan motor 33 is the motor of a type capable of changing the number of rotations, the air supply amount (air flow volume) from the fan unit 30 and the outlet unit 70 to the air conditioned space SA is changed not only with change in the opening degree of both or any one of the damper 38 and the air deflector 74 but with change in the number of rotations of the fan motor 33.

In a case where the fan motor 33 is the motor of a type incapable of changing the number of rotations and the air supply amount (air flow volume) from the fan unit 30 to the outlet unit 70 is changed only by the air deflector 74, an air deflector controller is provided instead of the fan controller 34. The main controller 40 sends the calculated air supply amount to the plurality of air deflector controllers as the target air supply amount. The main controller 40 sends, for example, the target air supply amount of the fan units 30a to 30d to the air deflector controllers attached to the fan units 30a to 30d. The target air supply amount of the fan units 30a to 30d is an instruction concerning the air supply amount of the fan units 30a to 30d. In other words, the main controller 40 sends a plurality of instructions to the plurality of air deflector controllers for controlling the fan units 30a to 30d. The air deflector controllers of the fan units 30a to 30d control the opening degree of the air deflector 74 to bring the air supply amount closer to the target air supply amount.

More specifically, for example, the air deflector controller of each of the fan units 30a to 30d compares volume of air (air supply amount) passing through the fan unit 30a detected by the differential pressure sensor 121 of each of the fan units 30a to 30d with the target air flow volume (target air supply amount). In a case where the volume of the air passing through the fan units 30a to 30d is smaller than the target air flow volume, the air deflector controller of each of the fan units 30a to 30d increases the opening degree of the air deflector 74 with the air deflector motor 75 and increases the air flow volume (air supply amount) of the fan units 30a to 30d to bring the air flow volume closer to the target air flow volume. Conversely, in a case where the volume of the air passing through the fan units 30a to 30d is greater than the target air flow volume, the opening degree of the air deflector 74 is reduced by the air deflector motor 75 and reduces the air flow volume (air supply amount) of the fan units 30a to 30d to bring the air flow volume closer to the target air flow volume.

(8) Characteristics 8-1

The air conditioning system 1 according to the second embodiment also has the features of the first embodiment described in (5-1).

8-2

The controller 300 of the second embodiment controls a plurality of actuators in accordance with a plurality of instructions concerning the air supply amounts of the plurality of fan units 30a to 30d. The actuator of the second embodiment is at least one of the fan motor 33, the driving motor 39, and the air deflector motor 75. Such control enables the air conditioning system 1 to adjust the volume of air passing through the use side heat exchanger 11 for efficient heat exchange in the use side heat exchanger 11, leading to the reduction in energy consumption of the air conditioning system 1. In the second embodiment, at least one of the plurality of fan controllers 34 of the controller 300, the plurality of damper controllers, and the plurality of air deflector controllers controls the plurality of actuators.

8-3

The controller 300 of the air conditioning system 1 of the second embodiment includes the main controller 40 for sending a plurality of instructions and at least one sub-controller for receiving the plurality of instructions from the main controller 40. Examples of the sub controller of the second embodiment include the fan controller 34, the damper controller, and the air deflector controller. The at least one sub-controller controls the plurality of actuators on a basis of the plurality of instructions. For example, in a case where the plurality of actuators are only the plurality of fan motors 33, the fan controllers 34 and the fan motors 33 may be provided in a one-to-one correspondence. Alternatively, the plurality of fan motors 33 may be provided so as to correspond to one fan controller 34. In such an air conditioning system 1, since the main controller 40 controls the plurality of actuators through at least one sub controller, the control by the main controller 40 is simplified to facilitate the duct design and the layout change in the system.

8-4

In the air conditioning system 1 of the second embodiment, each of the plurality of fan units 30a to 30d includes the differential pressure sensor 121 or a wind speed sensor that is an air flow volume detector for detecting volume of air passing through the unit. Each of the plurality of sub-controllers controls the number of rotations of the fan motors 33a to 33d in a manner to bring the air flow volume detected by the air flow volume detector closer to the air supply amount instructed by the controller 300. This allows the controller 300 to reliably control the air supply amounts of the fan units 30a to 30d.

8-5

In the air conditioning system 1 of the second embodiment, the controller 300 calculates the air supply amount of each of the fan units 30a to 30d on the basis of the temperature difference between the indoor air temperature to be adjusted by each of the plurality of fan units 30a to 30d and the set temperature, and determines a plurality of instructions on the basis of the calculated air supply amount. This allows the air conditioning system 1 to easily control the temperature of the air conditioned space SA by changing the air supply amount.

Third Embodiment (9) Overall Configuration

Figure 13:
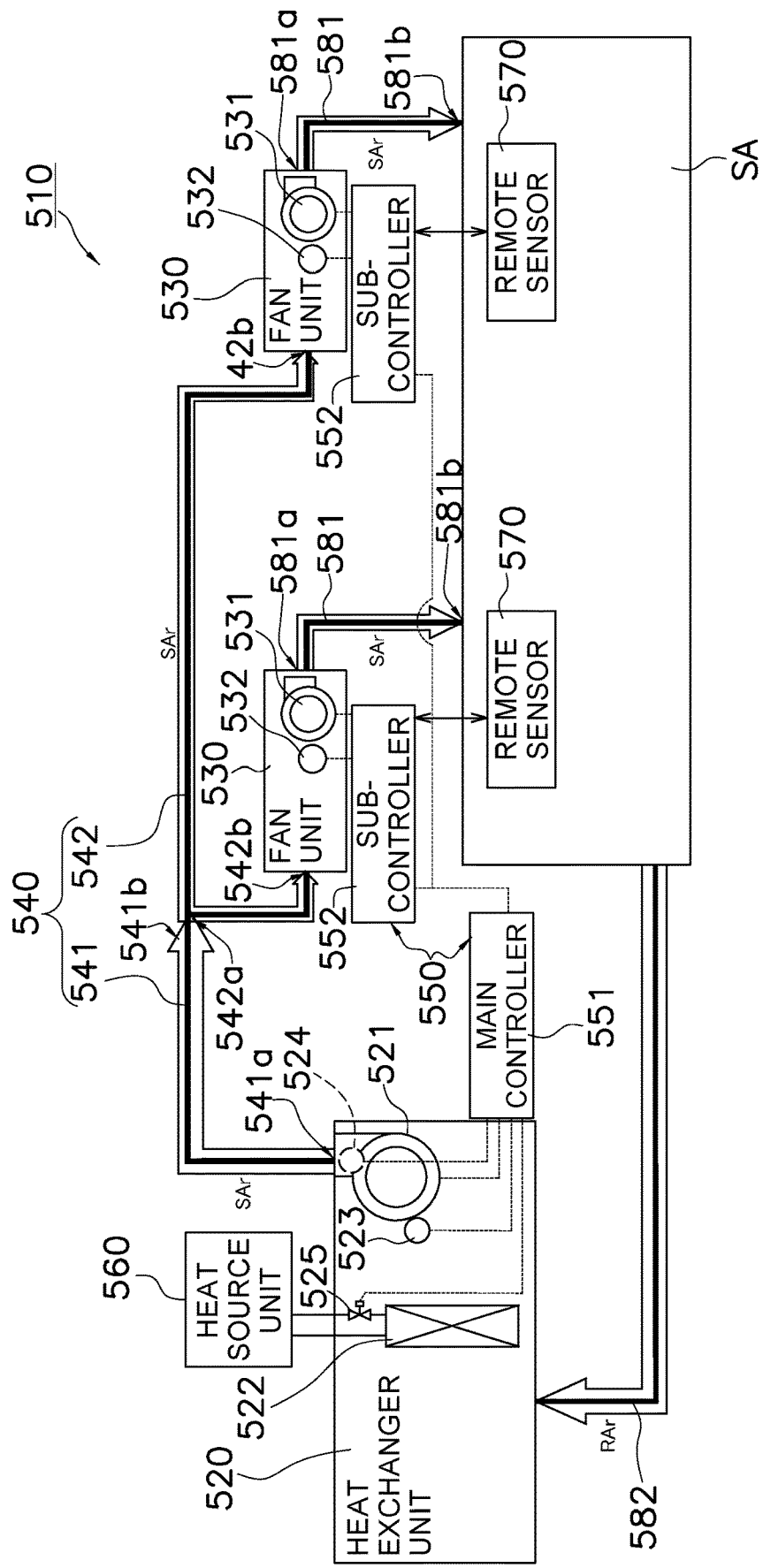
FIG. 13 is a conceptual diagram showing the configuration of an air conditioning system according to a third embodiment.

The air conditioning system 510 illustrated in FIG. 13 includes a heat exchanger unit 520, a fan unit 530, a plurality of ducts 540, and a controller 550. The heat exchanger unit 520 includes a second fan 521. Each of the plurality of fan units 530 includes a first fan 531. Each first fan 531 supplies air from the fan unit 530 to an air conditioned space SA. The air conditioned space SA is a room inside a building, for example. The room is a space where the movement of air is restricted by a floor, a ceiling, and walls, for example. The plurality of fan units 530 are disposed in the air conditioned space SA including one or more spaces. FIG. 13 is a diagram showing an example in which, as a representative example of the air conditioning system 510 including the plurality of fan units 530, the air conditioning system 510 including two fan units 530 is disposed in one air conditioned space SA. The number of fan units 530 may also be three or more, and is set appropriately. As described above, the number of air conditioned spaces SA in which the fan unit 530 is disposed may be two or more.

The duct 540 distributes air SAr delivered from the heat exchanger unit 520 by the second fan 521 to the plurality of fan units 530. The duct 540 includes a main pipe 541 and a branch pipe 542 that branches off from the main pipe 541. In FIG. 13, a case where the main pipe 541 is disposed outside the heat exchanger unit 520 is illustrated, but the main pipe 541 may also be disposed inside the heat exchanger unit 520, and may also be disposed to extend from the inside of the heat exchanger unit 520 to the outside of the heat exchanger unit 520. The case where the main pipe 541 is disposed inside the heat exchanger unit 520 also includes the case where a portion of a casing of the heat exchanger unit 520 functions as the main pipe 541. In FIG. 13, an example is illustrated, in which an entrance 541a of the main pipe 541 is connected to the heat exchanger unit 520. The second fan 521 is disposed inside the heat exchanger unit 520. Here, all of the air blown out from the second fan 521 is configured to flow into the duct 540.

An exit 541b of the main pipe 541 of the duct 540 is connected to an entrance 542a of the branch pipe 542. A plurality of exits 542b of the branch pipe 542 are connected to the plurality of fan units 530.

Each fan unit 530 and the air conditioned space SA are joined by an air flow passage 581. An entrance 581a of the air flow passage 581 is connected to the fan unit 530. An exit 581b of the air flow passage 581 is connected to the air conditioned space SA. Each first fan 531 produces air flow inside each fan unit 530, the air flow proceeding from the exits 542b of the duct 540 to the entrance 581a of the air flow passage 581. From a different perspective, each first fan 531 is suctioning the air SAr from the exits 542b of the branch pipe 542. Each first fan 531 can change the static pressure inside each fan unit 530 (in front of the entrance 581a of the air flow passage 581) by changing the rotation speed of each first fan 531 itself. Assuming that the static pressure in the duct 540 is constant, each first fan 531 can increase the rotation speed to thereby raise the static pressure inside each fan unit 530 (in front of the entrance 581a of the air flow passage 581). If the static pressure inside each fan unit 530 rises, the air quantity of the air SAr flowing through the air flow passage 581 increases. By changing the air quantity in this way, the air supply amount that is blown out from an exit 581b of each air flow passage 581 into the air conditioned spaces SA changes.

The controller 550 includes a main controller 551 and a plurality of sub-controllers 552. The main controller 551 and the plurality of sub-controllers 552 are interconnected to form the controller 550. The main controller 551 controls the rotation speed of the second fan 521. In other words, the main controller 551 controls the output of the second fan 521. If the output of the second fan 521 increases, the state of the second fan 521 changes in the direction of increasing air flow volume sent from the second fan 521.

One sub-controller 552 is provided with respect to each fan unit 530. Each sub-controller 552 outputs an instruction related to changing the air flow volume to a fan motor 531a of the corresponding first fan 531. Each sub-controller 552 stores a target air flow volume (target air supply amount). If the air supply amount is insufficient with respect to the target air flow volume, each sub-controller 552 outputs an instruction (an instruction related to changing the air flow volume) for increasing the rotation speed of the fan motor 531a of the first fan 531. Conversely, if the air supply amount is excessive with respect to the target air flow volume, each sub-controller 552 outputs an instruction (an instruction related to changing the air flow volume) for decreasing the rotation speed of the fan motor 531a of the first fan 531. The instruction related to changing the air flow volume is an instruction related to the air supply amount of the fan unit 530.

The controller 550 obtains information on the air supply amount to be supplied to the air conditioned space SA by the plurality of first fans 531. The information about the air supply amount indicates the quantity of air to be supplied to the air conditioned space SA per second, for example, and the quantity of air to be supplied may also be referred to as the necessary air supply amount. The controller 550 determines the demand output from the second fan 521 on the basis of the obtained information about the air supply amount. The controller 550 controls the output of the second fan 521 to meet the determined demand output. Specifically, each sub-controller 552 obtains information about the air supply amount of each corresponding fan unit 530 from the fan unit 530. Each sub-controller 552 outputs the information about the air supply amount to the main controller 551.

(10) Detailed Configuration (10-1) Heat Exchanger Unit 520

Besides the second fan 521 already described, the heat exchanger unit 520 includes a use side heat exchanger 522, a first air flow volume detecting means 523, a temperature sensor 524, and a water quantity adjustment valve 525. The use side heat exchanger 522 is supplied with cold water or hot water for example as a heat medium from the heat source unit 560. The heat medium supplied to the use side heat exchanger 522 may also be a liquid other than cold water or hot water, such as brine, for example. For the first air flow volume detecting means 523, an air flow sensor, a wind speed sensor, or a differential pressure sensor may be used, for example.

The first air flow volume detecting means 523 detects the air flow volume sent by the second fan 521. The first air flow volume detecting means 523 is connected to the main controller 551. The first air flow volume detecting means 523 transmits the value of the air flow volume detected by the first air flow volume detecting means 523 to the main controller 551. The air flow volume detected by the first air flow volume detecting means 523 is the volume of air flowing through the main pipe 541 of the duct 540. In other words, the air flow volume detected by the first air flow volume detecting means 523 is the total volume of air supply amount supplied to the air conditioned space SA from the plurality of fan units 530.

The temperature sensor 524 detects the temperature of the air SAr sent from the second fan 521 to the duct 540. The temperature sensor 524 is connected to the main controller 551. The temperature sensor 524 transmits the value of the temperature detected by the temperature sensor 524 to the main controller 551.

The heat exchanger unit 520 is joined to the air conditioned space SA through an air flow passage 582. The air RAr passing through the air flow passage 582 and returning from the air conditioned space SA is sent through the use side heat exchanger 522 to the duct 540 by the second fan 521. When passing through the use side heat exchanger 522, the air RAr exchanges heat with the cold water or hot water flowing through the use side heat exchanger 522 to become conditioned air. The water quantity adjustment valve 525 adjusts the amount of heat imparted to the air SAr that exchanges heat in the use side heat exchanger 522 and is sent to the duct 540. The opening degree of the water quantity adjustment valve 525 is controlled by the main controller 551. If the opening degree of the water quantity adjustment valve 525 is increased, the amount of water flowing through the use side heat exchanger 522 increases, and more heat is exchanged per unit time between the use side heat exchanger 522 and the air SAr. Conversely, if the opening degree of the water quantity adjustment valve 525 is decreased, the amount of water flowing through the use side heat exchanger 522 decreases, and less heat is exchanged per unit time between the use side heat exchanger 522 and the air SAr.

(10-2) Fan Unit 530

Besides the first fan 531 already described, each fan unit 530 includes a second air flow volume detecting means 532. The second air flow volume detecting means 532 detects the air flow volume sent by the first fan 531. Each second air flow volume detecting means 532 is connected to a corresponding sub-controller 552. The value of the air flow volume detected by the second air flow volume detecting means 532 is transmitted to the sub-controller 552. The air flow volume detected by the second air flow volume detecting means 532 is the volume of air flowing through the air flow passage 581. In other words, the air flow volume detected by the second air flow volume detecting means 532 is the air supply amount supplied to the air conditioned space SA from each fan unit 530. For the second air flow volume detecting means 532, an air flow sensor, a wind speed sensor, or a differential pressure sensor may be used, for example.

(10-3) Remote Sensor 570

A plurality of remote sensors 570 function as temperature sensors. Each remote sensor 570 is configured to transmit data indicating the temperature of the air conditioned space SA to a corresponding sub-controller 552.

(11) Operations by Air Conditioning System 510

Each of the plurality of sub-controllers 552 receives a detected value of the temperature of the target space from the respectively connected remote sensor 570. Each sub-controller 552 stores data indicating a set temperature. For example, the data indicating the set temperature is transmitted to each sub-controller 552 in advance from a remote controller (not illustrated) or the like. Each sub-controller 552 stores the data indicating the set temperature received from the remote controller or the like in a storage device 552b (see FIG. 14) such as a built-in memory. Each sub-controller 552 transmits the value of the set temperature to the main controller 551. On the basis of the set temperature, the main controller 551 determines a target air flow volume for each fan unit 530 according to the temperature detected by the corresponding remote sensor 570. The main controller 551 transmits the value of the target air flow volume to each sub-controller 552.

The main controller 551 determines the output of the second fan 521 according to the total combined target air flow volume to be supplied to the air conditioned space SA.

For example, if the case where the static pressure at the exit 541b of the main pipe 541 (entrance 542a of the branch pipe 542) takes an intermediate value between the static pressure at the entrance 541a of the main pipe 541 and the static pressure at the exits 542b of the branch pipe 542 is compared to the case of taking a larger value than the intermediate value, the ratio of the output of the second fan 521 is larger than the ratio of the output of the plurality of first fans 531 in the case of taking a larger value than the intermediate value. Conversely, if the case where the static pressure at the exit 541b of the main pipe 541 (entrance 542a of the branch pipe 542) takes the intermediate value is compared to the case of taking a value smaller than the intermediate value, the ratio of the output of the second fan 521 is smaller than the ratio of the plurality of first fans 531 in the case of taking a smaller value. An efficient range exists for the ratio of the output of the second fan 521 and the output of the plurality of first fans 531. Accordingly, the main controller 551 determines the output of the second fan 521 such that an efficient ratio is achieved. In other words, the main controller 551 determines the outputs of the second fan 521 to be a predetermined suitable output with respect to the total combined target air flow volume.

For example, if a method of determining the output of the second fan 521 like the following is considered, a range of the output of the second fan 521 suitable for reducing the power consumption of the output of the second fan 521 is demonstrated to exist. If the output of the second fan 521 is raised such that the total power consumption by the second fan 521 and the plurality of first fans 531 rises, the output of the second fan 521 is gradually decreased, and if the output of the second fan 521 is determined before the total power consumption by the second fan 521 and the plurality of first fans 531 rebounds, the range of the determined output is a range in which the power consumption is smaller compared to other ranges. Conversely, if the output of the second fan 521 is decreased such that the total power consumption by the second fan 521 and the plurality of first fans 531 rises, the output of the second fan 521 is gradually raised, and if the output of the second fan 521 is determined before the total power consumption by the second fan 521 and the plurality of first fans 531 rebounds, the range of the determined output is a range in which the power consumption is smaller compared to other ranges. If the output of the second fan 521 is raised such that the total power consumption by the second fan 521 and the plurality of first fans 531 decreases, the output of the second fan 521 is gradually raised, and if the output of the second fan 521 is determined before the total power consumption by the second fan 521 and the plurality of first fans 531 rebounds, the range of the determined output is a range in which the power consumption is smaller compared to other ranges. Conversely, if the output of the second fan 521 is decreased such that the total power consumption by the second fan 521 and the plurality of first fans 531 decreases, the output of the second fan 521 is gradually decreased, and if the output of the second fan 521 is determined before the total power consumption by the second fan 521 and the plurality of first fans 531 rebounds, the range of the determined output is a range in which the power consumption is smaller compared to other ranges. However, the method of determining the appropriate output of the second fan 521 is not limited to such a method.

After the main controller 551 determines the target air flow volume and transmits the value of the target air flow volume to each of the sub-controllers 552, each sub-controller 552 adjusts the rotation speed of the fan motor 531a of the first fan 531 (the rotation speed of the first fan 531) in each corresponding fan unit 530, except for the fan unit 530 with the highest fan efficiency. The numbers of revolutions of the plurality of first fans 531 of fan motors 531a are adjusted independently from each other.

At this time, for the determined output of the second fan 521, the rotation speed of fan motor 531a of first fan 531 in the fan unit 530 with the highest fan efficiency is at a maximum. Here, in the case where the static pressure at the entrance 542a of the branch pipe 542 is the same and the air supply amount to be supplied to the air conditioned space SA is the same, the fan unit 530 with the highest fan efficiency is the fan unit 530 with the lowest energy consumption. Further, in the case where the static pressure at the entrance 542a of the branch pipe 542 is the same and the air supply amount to be supplied to the air conditioned space SA is the same, the fan unit 530 with the lowest fan efficiency is the fan unit 530 with the highest energy consumption.

Each sub-controller 552 controls the rotation speed of each fan motor 531a of the first fan 531 such that the air supply amount matches the target air flow volume. The plurality of sub-controllers 552 control the numbers of revolutions of the plurality of fan motors 531a of first fans 531 independently from each other. If the air flow volume detected by the second air flow volume detecting means 532 is small compared to the target air flow volume, each sub-controller 552 increases the rotation speed of each fan motor 531a of the first fan 531. If the air flow volume detected by the second air flow volume detecting means 532 is large compared to the target air flow volume, each sub-controller 552 decreases the rotation speed of each fan motor 531a of the first fan 531. If the rotation speed of the fan unit 530 with the highest fan efficiency falls, the main controller 551 makes an adjustment by changing the output of the second fan 521 such that the rotation speed of the fan unit 530 with the highest fan efficiency is maximized.

In the case of changing the operating state of at least one of the plurality of first fans 531 or changing the air flow volume of at least one of the plurality of first fans 531, the main controller 551 prioritizes increasing the output of a fan with high fan efficiency or decreasing the output of a fan with low fan efficiency from among the second fan 521 and the plurality of first fans 531. In other words, in the case of increasing the air supply amount to be supplied to the air conditioned space SA, the main controller 551 determines the output of the second fan 521 and the target air flow volume of the plurality of fan units 530 to increase the output of a fan with high fan efficiency from among the second fan 521 and the plurality of first fans 531. Conversely, in the case of decreasing the air supply amount to be supplied to the air conditioned space SA, the main controller 551 determines the output of the second fan 521 and the target air flow volume of the plurality of fan units 530 to decrease the output of a fan with high fan efficiency from among the second fan 521 and the plurality of first fans 531.

However, in the case where the air flow volume of the fan unit 530 with the maximum fan efficiency among the plurality of fan units 530 does not reach the target air flow volume, the main controller 551 increases the output of the first fan 531. At this time, the main controller 551 increases the output of the first fan 531 and also keeps the rotation speed of the fan motor 531a of the first fan 531 in the fan unit 530 with the maximum fan efficiency at maximum.

Figure 14:
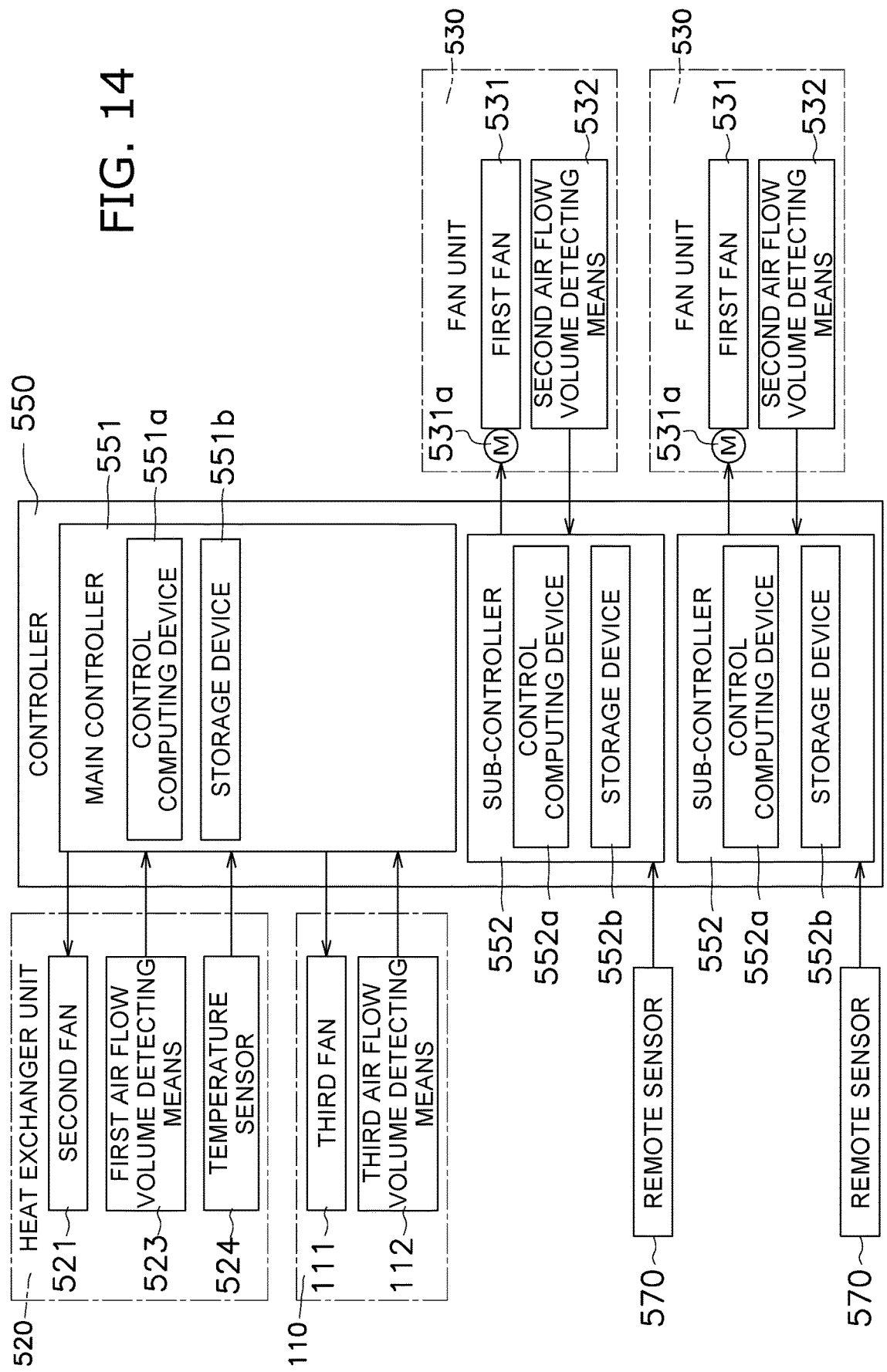
FIG. 14 is a block diagram for explaining the configuration of a controller.

The controller 550 is achieved by a computer. The controller 550 is provided with control computing devices 551a and 552a, and storage devices 551b and 552b. For the control computing devices 551a and 552a, a processor such as a CPU or GPU may be used. The control computing devices 551a and 552a read out programs stored in the storage devices 551b and 552b, and perform predetermined image processing and arithmetic processing according to the programs. Furthermore, the control computing devices 551a and 552a may follow the programs to write arithmetic results to the storage devices 551b and 552b or read out information stored in the storage devices 551b and 552b. In FIG. 14, various function blocks achieved by the control computing devices 551a and 552a are illustrated. The storage devices 551b and 552b may be used as databases.

(13) Modifications (13-1) Modification 3A

Figure 15:
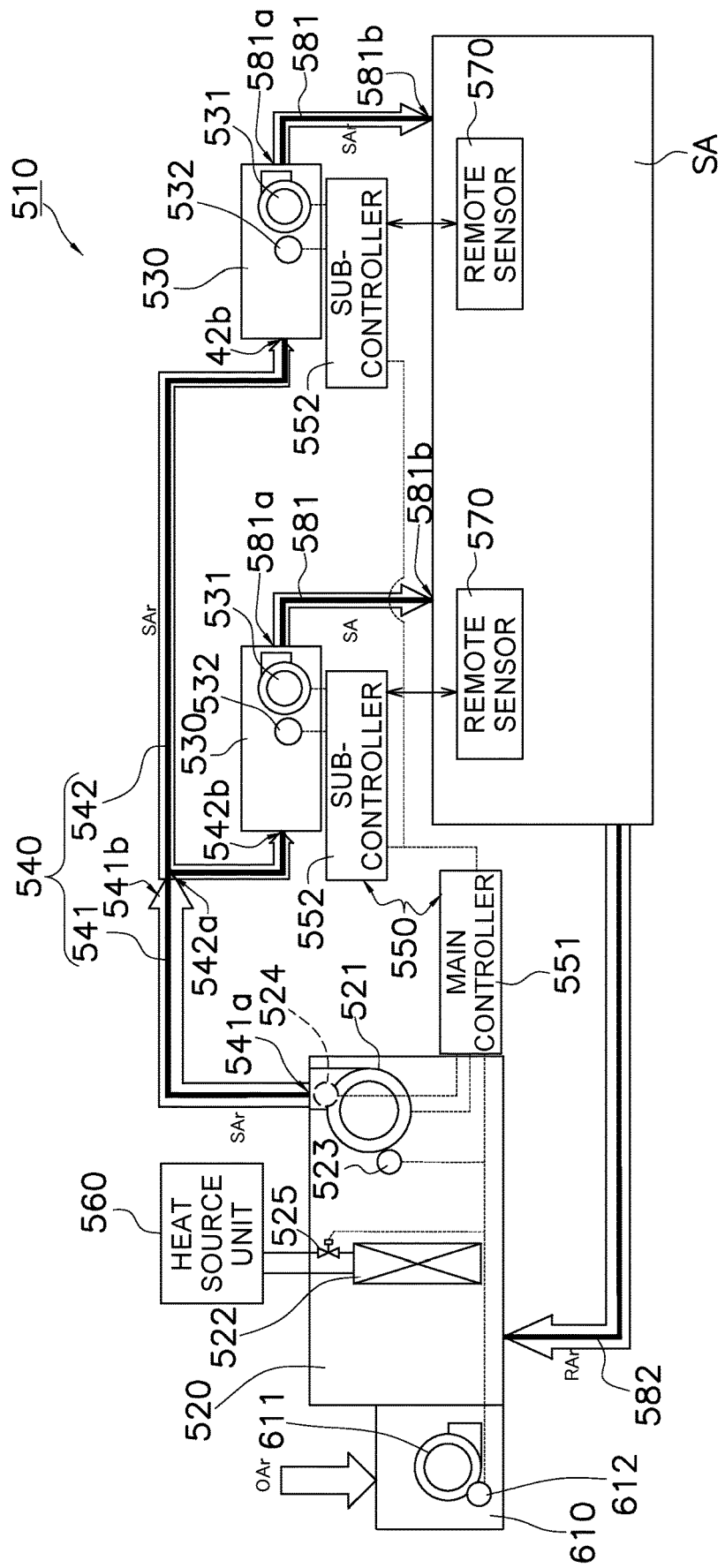
FIG. 15 is a conceptual diagram showing another example of the configuration of an air conditioning system according to a modification.

As illustrated in FIG. 15, an outdoor air introduction unit 610 may also be attached to the heat exchanger unit 520. The outdoor air introduction unit 610 includes a third fan 611 and a third air flow volume detecting means 612. The outdoor air introduction unit 610 uses the third fan 611 to take in and send outdoor air OAr from outside the air conditioned space SA to the heat exchanger unit 520. The third air flow volume detecting means 612 detects the air flow volume of the outdoor air OAr sent to the heat exchanger unit 520. The third air flow volume detecting means 612 transmits the detected value of the sent air flow volume of the outdoor air OAr to the main controller 551. In the case where the outdoor air OAr is sent from the outdoor air introduction unit 610 to the heat exchanger unit 520, the main controller 551 may be configured to correct the control of the output of the second fan 521 according to the sent air flow volume of the outdoor air OAr. For the third air flow volume detecting means 612, an air flow sensor, a wind speed sensor, or a differential pressure sensor may be used, for example.

(14) Characteristics 14-1

The air conditioning system 510 according to the third embodiment is provided with the controller 550, the plurality of ducts 540, and the plurality of fan units 530. The plurality of ducts 540 distribute conditioned air that has passed through the use side heat exchanger 522 of the heat exchanger unit 520. The plurality of fan units 530 are provided in correspondence with the plurality of ducts 540, and supply conditioned air from the heat exchanger unit 520 to the air conditioned space SA through the plurality of ducts 540. A plurality of actuators, namely the plurality of fan motors 531a, are configured to change the air supply amount of conditioned air to be supplied to the air conditioned space SA. Each of the plurality of ducts 540 is disposed in one of a plurality of distribution flow paths. Each of the plurality of fan units 530 includes a first fan 531, and is disposed in one of the plurality of distribution flow paths. Each of the plurality of actuators is disposed in one of the plurality of distribution flow paths. By controlling the plurality of fan motors 531a, the controller 300 controls the air supply amount of each of the plurality of fan units 530. As a result, the air conditioning system 510 according to the third embodiment can adjust the air flow volume passing through the use side heat exchanger 522 such that heat is exchanged efficiently in the use side heat exchanger 522, and energy consumption can be moderated.

14-2

In the air conditioning system 510 according to the third embodiment, the controller 550 controls the plurality of fan motors 531a according to a plurality of instructions related to the air supply amounts of the plurality of fan units 530. Consequently, the controller 550 controls the plurality of fan motors 531a according to the instructions related to the air supply amounts with respect to the plurality of fan motors 531a, and adjusts the air flow volume passing through the use side heat exchanger 522 such that heat is exchanged efficiently in the use side heat exchanger 522 to moderate energy consumption.

14-3

In the air conditioning system 510 of the third embodiment, the controller 550 includes the main controller 551 for sending a plurality of instructions and at least one sub-controller 552 for receiving the plurality of instructions from the main controller 551. The at least one sub-controller 552 controls the plurality of fan motors 531a on a basis of the plurality of instructions. As a result, the control by the main controller 551 is simplified, making it easy to change the duct design and layout of the system.

14-4

In the air conditioning system 510 of the third embodiment, each of the plurality of fan units 530 includes the second air flow volume detecting means 532 that is air flow volume detector for detecting volume of air passing through the unit. Each of the plurality of sub-controllers 552 controls the number of rotations of the fan motor 531a in a manner to bring the air flow volume detected by the second air flow volume detecting means 532 closer to the air supply amount instructed by the main controller 551. As a result, the sub-controller 552 can reliably controls the air supply amounts of the fan units 530.

14-5

In the air conditioning system 510 of the third embodiment, the controller 550 calculates the air supply amount of each of the fan units 530 on the basis of the temperature difference between the indoor air temperature to be adjusted by each of the plurality of fan units 530 and the set temperature, and determines a plurality of instructions on the basis of the calculated air supply amount. Consequently, in the air conditioning system 510, temperature control of the air conditioned space is achieved easily by changing the air supply amount.

14-6

In the air conditioning system 510 according to the third embodiment, the heat exchanger unit 520 includes the second fan 521. In the air conditioning system 510, the controller 550 controls the second fan 521 on the basis of the air supply amounts of the plurality of fan units 530. In this way, the controller 550 can control the second fan 521 to an appropriate value to match the air supply amounts of the plurality of first fans 531, and moderate the energy consumption of the air conditioning system 510.

14-7

In the air conditioning system 510 according to the third embodiment, the heat exchanger unit 520 includes the second fan 521. In the air conditioning system 510, the controller 550 includes the main controller 551 and the plurality of sub-controllers 552. The main controller 551 controls the plurality of fan motors 531a according to a plurality of instructions related to the air supply amounts of the fan units 530. The sub-controllers 552 respectively receive the plurality of instructions transmitted by the main controller 551 to control the plurality of fan motors 531a. The main controller 551 controls the second fan 521 to be a predetermined output with respect to the total combined air supply amount indicated by the plurality of instructions. As a result, in the air conditioning system 510, the second fan 521 is easily controlled to set the output of the second fan 521 to an appropriate value to match the air supply amounts of the plurality of first fans 531. The embodiments of the present disclosure have been described above, but it will be understood that various modifications can be made to the embodiments and details without departing from the object and the scope of the present disclosure recited in the claims.

REFERENCE SIGNS LIST 1, 510: Air conditioning system
10, 520: Heat exchanger unit
11, 522: Use side heat exchanger
20, 20a to 20e, 540: Duct
30, 30a to 30d, 30M, 30GM, 30S, 530: Fan unit
32, 32a to 32d: Fan (example of first fan)
33, 531a: Fan motor (example of actuator)
34: Fan controller (example of sub-controller)
38: Damper
39: Driving motor (example of actuator)
40: Main controller
50: Heat source unit
51: Compressor
52: Heat source side heat exchanger
53: Expansion valve
60, 60a to 60d: Remote controller
74: Air deflector
75: Air deflector motor (example of actuator)
101: Intake temperature sensor
102: Gas-side temperature sensor (example of heat medium temperature sensor)
103: Liquid-side temperature sensor (example of heat medium temperature sensor)
104: Use side heat exchanger temperature sensor (example of heat medium temperature sensor)
121: Differential pressure sensor (example of air flow volume detector)
300: Controller
531: First fan
521: Second fan
550: Controller
551: Main controller
552: Sub-controller
SA: Air conditioned space

CITATION LIST

Patent Literature

Patent Literature 1: JP H11-132489 A

The invention claimed is:

1. An air conditioning system provided with a heat exchanger unit, including a use side heat exchanger, that generates conditioned air through heat exchange in the use side heat exchanger and supplies the conditioned air to an air conditioned space through a plurality of distribution flow paths that communicate with the heat exchanger unit, comprising:
a controller;
a plurality of ducts used to distribute the conditioned air passing through the use side heat exchanger of the heat exchanger unit;
a plurality of fan units provided in correspondence with the plurality of ducts and configured to supply the conditioned air from the heat exchanger unit to the air conditioned space through the plurality of ducts; and
a plurality of actuators configured to change an air supply amount of the conditioned air to be supplied to the air conditioned space, wherein
each of the plurality of ducts is disposed in one of the plurality of distribution flow paths,
each of the plurality of fan units includes a first fan and is disposed in one of the plurality of distribution flow paths,
each of the plurality of actuators is disposed in one of the plurality of distribution flow paths,
the controller controls the plurality of actuators to control the air supply amounts of the plurality of fan units, and
the controller calculates the air supply amounts of each of the fan units from a temperature difference between an indoor air temperature adjusted by each of the plurality of fan units and a set temperature, and a fan temperature, and determines the plurality of instructions on a basis of the calculated air supply amounts.

2. The air conditioning system according to claim 1, wherein
the controller controls the plurality of actuators in accordance with a plurality of instructions related to the air supply amounts of the plurality of fan units.

3. The air conditioning system according to claim 2, wherein
the controller includes a main controller that transmits the plurality of instructions and at least one sub-controller that receives the plurality of instructions from the main controller, and
the at least one sub-controller controls the plurality of actuators on a basis of the plurality of instructions.

4. The air conditioning system according to claim 3, wherein
each of the plurality of actuators is a fan motor that drives the first fan.

5. The air conditioning system according to claim 4, wherein
the at least one sub-controller is a plurality of sub-controllers,
each of the plurality of fan units includes an air flow volume detector that detects the air flow volume passing through each unit, and each of the plurality of sub-controllers controls a rotation speed of the fan motor such that the air flow volume detected by the air flow volume detector approaches the air supply amounts indicated by the instructions from the main controller.

6. The air conditioning system according to claim 1, wherein
the heat exchanger unit includes a second fan, and
the controller controls the second fan on a basis of the air supply amounts of the plurality of fan units.

7. The air conditioning system according to claim 1, wherein
the heat exchanger unit includes a second fan,
the controller includes a main controller that controls the plurality of actuators in accordance with a plurality of instructions related to the air supply amounts of the plurality of fan units, and a plurality of sub-controllers that receive the plurality of instructions transmitted by the main controller and control the plurality of actuators, and
the main controller controls the second fan to be a predetermined output with respect to a total combined air supply amount indicated by the plurality of instructions.

8. The air conditioning system according to claim 1, wherein
the controller includes at least one sub-controller that controls the plurality of actuators and a main controller that communicates with the at least one sub-controller, and
the main controller is disposed in the heat exchanger unit.

9. The air conditioning system according to claim 1, wherein
the controller includes at least one sub-controller that controls the plurality of actuators and a main controller that communicates with the at least one sub-controller, and
the main controller is disposed in one of the plurality of fan units.

10. The air conditioning system according to claim 1, wherein
the controller includes at least one sub-controller that controls the plurality of actuators and a main controller that communicates with the at least one sub-controller, and
the main controller is disposed in a location other than the heat exchanger unit or the plurality of fan units.

11. The air conditioning system according to claim 1, wherein
an air flow passing through the use side heat exchanger is produced by only air suction force of the plurality of fan units.

12. The air conditioning system according to claim 1, wherein
the heat exchanger unit includes at least one of a heat medium temperature sensor that detect the temperature of a heat medium flowing through the use side heat exchanger or a pipe connected to the use side heat exchanger, and an intake temperature sensor that detects the temperature of air suctioned into the heat exchanger unit, and
the heat medium temperature sensor and/or the intake temperature sensor is connected to the main controller.

13. The air conditioning system according to claim 12, wherein
the main controller uses a detected value from at least one of the heat medium temperature sensor and the intake temperature sensor to determine an instruction related to increasing or decreasing the air supply amounts.

14. The air conditioning system according to claim 1, further comprising
a remote controller including a set temperature function that sets a temperature of the air conditioned space and a function that detects an indoor temperature of the air conditioned space, wherein
the main controller uses the set temperature of the remote controller and the indoor temperature detected by the remote controller to determine an instruction related to increasing or decreasing the air supply amounts.

15. The air conditioning system according to claim 1, further comprising:
a compressor that compresses a refrigerant;
a heat source side heat exchanger that exchanges heat with the refrigerant circulating through the use side heat exchanger; and
an expansion valve that causes the refrigerant flowing between the use side heat exchanger and the heat source side heat exchanger to expand, wherein
the main controller is connected to the compressor and/or the expansion valve to control system operation.

16. The air conditioning system according to claim 1, further comprising:
a compressor that compresses a refrigerant;
a heat source side heat exchanger that exchanges heat with the refrigerant circulating through the use side heat exchanger; and
an expansion valve that causes the refrigerant flowing between the use side heat exchanger and the heat source side heat exchanger to expand, wherein
the main controller calculates an operating frequency of the compressor and/or an opening degree of the expansion valve from a total air flow volume of air passing through the use side heat exchanger obtained by adding up the air supply amounts transmitted from all fan units, and the temperature of air suctioned into the heat exchanger unit.

17. The air conditioning system according to claim 1, further comprising:
a compressor that compresses a refrigerant;
a heat source side heat exchanger that exchanges heat with the refrigerant circulating through the use side heat exchanger; and
an expansion valve that causes the refrigerant flowing between the use side heat exchanger and the heat source side heat exchanger to expand, wherein
the main controller controls the plurality of actuators on a basis of information indicating the operating frequency of the compressor and/or the opening degree of the expansion valve.

18. The air conditioning system according to claim 1, wherein
the main controller controls the air flow volume passing through the use side heat exchanger with an actuator in at least one duct among the plurality of ducts while adjusting the actuator in the at least one duct such that the conditioned air proceeding from the heat exchanger unit toward the air conditioned space in the at least one duct does not flow back.

19. The air conditioning system according to claim 18, further comprising
a plurality of dampers or a plurality of air deflectors, wherein
each of the plurality of dampers or the plurality of air deflectors is disposed in one of the plurality of distribution flow paths, the plurality of actuators include a plurality of motors that drive the plurality of dampers or the plurality of air deflectors, and the main controller adjusts an opening degree of a damper or an air deflector in at least one duct among the plurality of ducts such that the conditioned air proceeding from the heat exchanger unit toward the air conditioned space in the at least one duct does not flow back.

20. The air conditioning system according to claim 18, wherein the plurality of actuators include a plurality of fan motors configured to change an individual air supply amount of each of the plurality of fan units, and the main controller adjusts a rotation speed of a fan motor in at least one duct among the plurality of ducts such that the conditioned air proceeding from the heat exchanger unit toward the air conditioned space in the at least one duct does not flow back.

* * * * *